US008619563B2

United States Patent
Madan et al.

(10) Patent No.: US 8,619,563 B2
(45) Date of Patent: Dec. 31, 2013

(54) METHOD AND APPARATUS FOR INTERFERENCE MANAGEMENT IN A WIRELESS COMMUNICATION SYSTEM

(75) Inventors: Ritesh K. Madan, Jersey City, NJ (US); Jaber M. Borran, San Diego, CA (US); Aamod D. Khandekar, San Diego, CA (US); Tingfang Ji, San Diego, CA (US); Ashwin Sampath, Skillman, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 483 days.

(21) Appl. No.: 12/698,349

(22) Filed: Feb. 2, 2010

(65) Prior Publication Data

US 2010/0202289 A1 Aug. 12, 2010

Related U.S. Application Data

(60) Provisional application No. 61/149,601, filed on Feb. 3, 2009.

(51) Int. Cl.
*H04L 12/26* (2006.01)

(52) U.S. Cl.
USPC ........................................ 370/230; 370/236.1

(58) Field of Classification Search
USPC .......................................... 370/230–236, 252
See application file for complete search history.

(56) References Cited

U.S. PATENT DOCUMENTS

| 2005/0136840 | A1 | 6/2005 | Molnar et al. |
| 2007/0025244 | A1 | 2/2007 | Ayyagari et al. |
| 2007/0030828 | A1 | 2/2007 | Vimpari et al. |
| 2007/0105575 | A1* | 5/2007 | Sampath et al. ............... 455/509 |
| 2007/0109986 | A1 | 5/2007 | Kwak et al. |
| 2008/0161031 | A1 | 7/2008 | Tu |
| 2008/0287132 | A1 | 11/2008 | Torsner et al. |
| 2009/0180451 | A1 | 7/2009 | Alpert et al. |
| 2009/0225712 | A1* | 9/2009 | Stamoulis et al. ............. 370/329 |
| 2010/0329113 | A1 | 12/2010 | Madan et al. |

FOREIGN PATENT DOCUMENTS

WO WO2007051140 5/2007

OTHER PUBLICATIONS

Ehsan Maani et al: "Resource Allocation for Downlink Multiuser Video Transmission Over Wireless Lossy Networks" IEEE Transactions on Image Processing, IEEE Service Center, Piscataway, NJ, US, vol. 17, No. 9, (Sep. 1, 2008), p. 1663-1671, XP011247953.
International Search Report and Written Opinion—PCT/US2010/023101, International Search Authority—European Patent Office—Aug. 17, 2010.

(Continued)

*Primary Examiner* — Gary Mui
(74) *Attorney, Agent, or Firm* — Nerrie M. Zohn

(57) ABSTRACT

Systems and methodologies are described herein that facilitate interference control and resource management in a wireless communication system. As described herein, a base station, terminal, and/or other entity in a wireless communication system that observes interference from one or more other network entities can construct and communicate resource utilization messages (RUMs) in order to request the interfering network entities to conduct power backoff on designated resources. Parameters constructed as a function of quality of service (QoS) and/or priority metrics (such as head-of-line delays, queue lengths, burst sizes, delay targets, average rates, or the like) can be included within the RUM, such that an entity receiving the RUM can compute QoS changes associated with various power backoff levels in order to select a power backoff level that maximizes overall system QoS performance.

55 Claims, 13 Drawing Sheets

(56) References Cited

OTHER PUBLICATIONS

Partial International Search Report—PCT/US10/023101, International Search Authority—European Patent Office—May 11, 2010.
Qualcomm Europe: "Coordinated Multi-Point downlink transmission in LTE-Advanced" 3GPP Draft; RI-084400 Comp, 3RD Generation Partnership Project (3GPP), Mobile Competence Centre; 650, Route Des Lucioles; F-06921 Sophia-Antipolis Cedex; France, no. Prague, Czech Republic; 20081105, Nov.5, 2008, XP050317663.
Qualcomm Europe: "Impact of Downlink CoMP on the Air Interface" 3GPP Draft; RI-090366, 3RD Generation Partnership Project (3GPP), Mobile Competence Centre; 650, Route Des Lucioles; F-06921 Sophia-Antipolis Cedex; France, no. Ljubljana; 20090108, Jan. 8, 2009, XP050318270 [retrieved on Jan. 8, 2009] the whole document.
Stanczak S.,et al., "Distributed Utility-Based Power Control: Objectives and Algorithms," IEEE Transactions on Signal Processing, 2007, vol. 55 (10), 5058-5068.
Zheng et al., "Collaboration and fairness in opportunistic spectrum access," 2005, vol. 5, 3132-3136.
Agrawal, et al., "Joint Scheduling and Resource Allocation in CDMA Systems," 2nd Workshop on Modeling and Optimization in Mobile, Ad Hoc, and Wireless Networks (WiOpt '04), Mar. 24-26, 2004, Cambridge, United Kingdom.
QUALCOMM Europe, "ComP analysis in presence of bursty traffic", 3GPP TSG-RAN WG1 #56, R1-090869, Feb. 13, 2009, pp. 1-16.
Taiwan Search Report—TW099103213—TIPO—Mar. 1, 2013.

\* cited by examiner

METHOD AND APPARATUS FOR INTERFERENCE MANAGEMENT IN A WIRELESS COMMUNICATION SYSTEM

CROSS-REFERENCE

This application claims the benefit of U.S. Provisional Application Ser. No. 61/149,601, filed Feb. 3, 2009, and entitled "A METHOD AND APPARATUS FOR DISTRIBUTED INTERFERENCE MANAGEMENT SCHEMES FOR UNPLANNED DEPLOYMENTS," the entirety of which is incorporated herein by reference.

BACKGROUND

I. Field

The present disclosure relates generally to wireless communications, and more specifically to techniques for managing interference levels within a wireless communication environment.

II. Background

Wireless communication systems are widely deployed to provide various communication services; for instance, voice, video, packet data, broadcast, and messaging services can be provided via such wireless communication systems. These systems can be multiple-access systems that are capable of supporting communication for multiple terminals by sharing available system resources. Examples of such multiple-access systems include Code Division Multiple Access (CDMA) systems, Time Division Multiple Access (TDMA) systems, Frequency Division Multiple Access (FDMA) systems, and Orthogonal Frequency Division Multiple Access (OFDMA) systems.

Generally, a wireless multiple-access communication system can simultaneously support communication for multiple wireless terminals. In such a system, each terminal can communicate with one or more base stations via transmissions on the forward and reverse links. The forward link (or downlink) refers to the communication link from the base stations to the terminals, and the reverse link (or uplink) refers to the communication link from the terminals to the base stations. This communication link can be established via a single-in-single-out (SISO), multiple-in-signal-out (MISO), or a multiple-in-multiple-out (MIMO) system.

Wireless communication systems can be configured to include a series of wireless access points, which can provide coverage for respective locations within the system. Such a network structure is generally referred to as a cellular network structure, and access points and/or the locations they respectively serve in the network are generally referred to as cells. In conventional wireless network implementations, a set of base stations can be utilized to provide network coverage for respective geographic areas corresponding to the base stations. Further, power levels of respective base stations in a wireless network can differ from base station to base station, based on factors such as the relative sizes of areas covered by the base stations and/or other such factors. For example, macro base stations can be configured to cover a large area and utilize a large power class, while pico base stations, femto base stations, or the like can be configured to cover a smaller area and utilize lower power.

In a wireless communication environment having unplanned deployments, such as femto base stations or the like, interference between respective communicating entities (e.g., base stations, terminals, etc.) can cause significant degradation in system communication performance. Moreover, in the event that such interference is sufficiently large, outages can result in various instances. Accordingly, it would be desirable to implement techniques for resource control and interference management in a wireless communication system.

SUMMARY

The following presents a simplified summary of various aspects of the claimed subject matter in order to provide a basic understanding of such aspects. This summary is not an extensive overview of all contemplated aspects, and is intended to neither identify key or critical elements nor delineate the scope of such aspects. Its sole purpose is to present some concepts of the disclosed aspects in a simplified form as a prelude to the more detailed description that is presented later.

According to an aspect, a method is described herein. The method can comprise identifying one or more priority parameters associated with a communication link and a designated set of resources for communication via the communication link; constructing a resource utilization message (RUM), the RUM comprising a request for reduction of transmit power on the designated set of resources and a function of the one or more priority parameters; and communicating the RUM to at least one interfering network node.

A second aspect described herein relates to a wireless communications apparatus, which can comprise a memory that stores data relating to a communication link, one or more priority parameters associated with the communication link, and a designated set of resources for communication via the communication link. The wireless communications apparatus can further comprise a processor configured to construct a RUM, the RUM comprising a request for reduction of transmit power on the designated set of resources and a function of the one or more priority parameters, and to communicate the RUM to at least one interfering network node.

A third aspect relates to an apparatus, which can comprise means for constructing resource utilization messaging that includes a request for power backoff on a specified set of resources and a function of at least one priority metric associated with the specified set of resources and means for communicating the resource utilization messaging to at least one network node from which interference is observed.

A fourth aspect described herein relates to a computer program product, which can include a computer-readable medium that comprises code for causing a computer to construct resource utilization messaging that includes a request for power backoff on a specified set of resources and a function of at least one priority metric associated with the specified set of resources and code for causing a computer to communicate the resource utilization messaging to at least one network node from which interference is observed.

According to a fifth aspect, a method is described herein that can comprise obtaining respective RUMs requesting power backoff on a specified set of resources, the respective RUMs comprising one or more parameters constructed as a function of at least one priority metric and determining an extent of power backoff to be performed on the specified set of resources based on the respective RUMs and the one or more parameters constructed as a function of at least one priority metric within the respective RUMs.

A sixth aspect described herein relates to a wireless communications apparatus, which can comprise a memory that stores data relating to respective RUMs requesting power backoff on a specified set of resources, the respective RUMs comprising one or more parameters constructed as a function of at least one priority metric. The wireless communications apparatus can further comprise a processor configured to determine an extent of power backoff to be performed on the specified set of resources based on the respective RUMs and the one or more parameters constructed as a function of at least one priority metric within the respective RUMs.

A seventh aspect relates to an apparatus, which can comprise means for receiving resource utilization messaging that includes a request for transmit power reduction on designated resources and a function of one or more link quality metrics associated with the designated resources and means for determining an amount of transmit power reduction to be applied on the designated resources based at least in part on the one or more parameters constructed as a function of at least one priority metric provided in the resource utilization messaging.

An eighth aspect described herein relates to a computer program product, which can include a computer-readable medium that comprises code for causing a computer to receive resource utilization messaging that includes a request for transmit power reduction on designated resources and a function of one or more link quality metrics associated with the designated resources and code for causing a computer to determine an amount of transmit power reduction to be applied on the designated resources based at least in part on the one or more parameters constructed as a function of at least one priority metric provided in the resource utilization messaging.

To the accomplishment of the foregoing and related ends, one or more aspects of the claimed subject matter comprise the features hereinafter fully described and particularly pointed out in the claims. The following description and the annexed drawings set forth in detail certain illustrative aspects of the claimed subject matter. These aspects are indicative, however, of but a few of the various ways in which the principles of the claimed subject matter can be employed. Further, the disclosed aspects are intended to include all such aspects and their equivalents.

DETAILED DESCRIPTION

Figure 1:
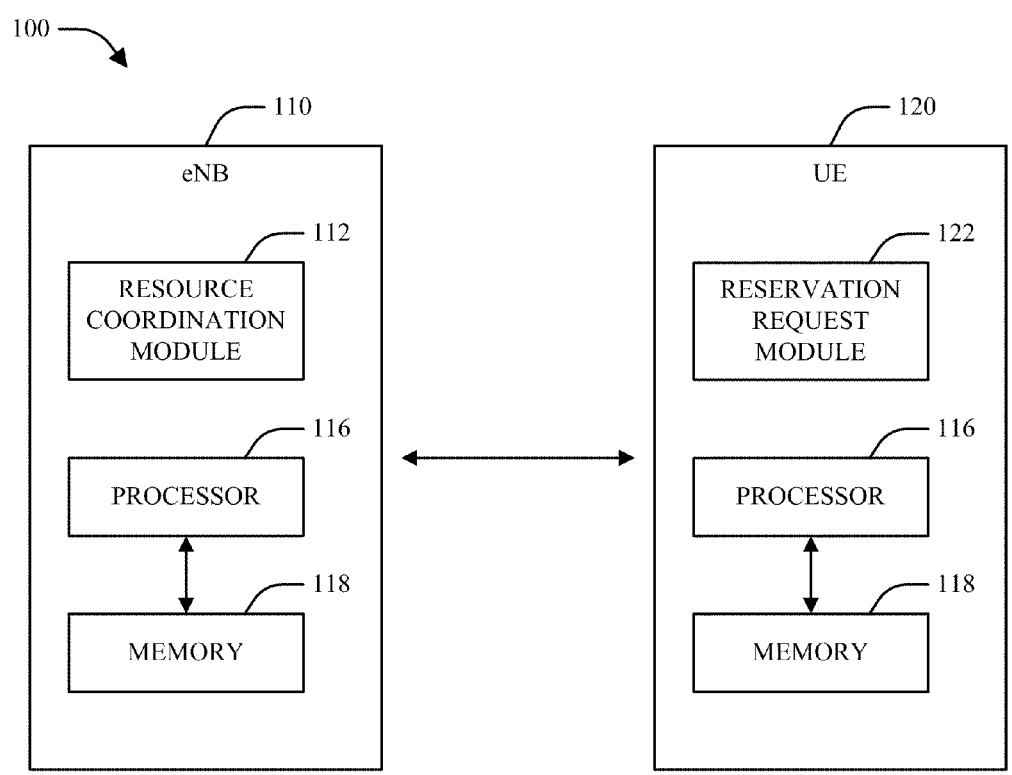
FIG. 1 is a block diagram of a system for resource coordination and interference management within a wireless communication system in accordance with various aspects.

Various aspects of the claimed subject matter are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

As used in this application, the terms "component," "module," "system," and the like are intended to refer to a computer-related entity, either hardware, firmware, a combination of hardware and software, software, or software in execution. For example, a component can be, but is not limited to being, a process running on a processor, an integrated circuit, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

Furthermore, various aspects are described herein in connection with a wireless terminal and/or a base station. A wireless terminal can refer to a device providing voice and/or data connectivity to a user. A wireless terminal can be connected to a computing device such as a laptop computer or desktop computer, or it can be a self contained device such as a personal digital assistant (PDA). A wireless terminal can also be called a system, a subscriber unit, a subscriber station, mobile station, mobile, remote station, access point, remote terminal, access terminal, user terminal, user agent, user device, or user equipment (UE). A wireless terminal can be a subscriber station, wireless device, cellular telephone, PCS telephone, cordless telephone, a Session Initiation Protocol (SIP) phone, a wireless local loop (WLL) station, a personal digital assistant (PDA), a handheld device having wireless connection capability, or other processing device connected to a wireless modem. A base station (e.g., access point or Node B) can refer to a device in an access network that communicates over the air-interface, through one or more sectors, with wireless terminals. The base station can act as a router between the wireless terminal and the rest of the access network, which can include an Internet Protocol (IP) network, by converting received air-interface frames to IP packets. The base station also coordinates management of attributes for the air interface.

Moreover, various functions described herein can be implemented in hardware, software, firmware, or any combination thereof. If implemented in software, the functions can be stored on or transmitted over as one or more instructions or code on a computer-readable medium. Computer-readable media includes both computer storage media and communication media including any medium that facilitates transfer of a computer program from one place to another. A storage media can be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc (BD), where disks usually reproduce data magnetically and discs reproduce data optically with lasers. Combinations of the above should also be included within the scope of computer-readable media.

Various techniques described herein can be used for various wireless communication systems, such as Code Division Multiple Access (CDMA) systems, Time Division Multiple Access (TDMA) systems, Frequency Division Multiple Access (FDMA) systems, Orthogonal Frequency Division Multiple Access (OFDMA) systems, Single Carrier FDMA (SC-FDMA) systems, and other such systems. The terms "system" and "network" are often used herein interchangeably. A CDMA system can implement a radio technology such as Universal Terrestrial Radio Access (UTRA), CDMA2000, etc. UTRA includes Wideband-CDMA (W-CDMA) and other variants of CDMA. Additionally, CDMA2000 covers the IS-2000, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is an upcoming release that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Further, CDMA2000 and UMB are described in documents from an organization named "3rd Generation Partnership Project 2" (3GPP2).

Various aspects will be presented in terms of systems that can include a number of devices, components, modules, and the like. It is to be understood and appreciated that the various systems can include additional devices, components, modules, etc. and/or omit some or all of the devices, components, modules etc. discussed in connection with the figures. A combination of these approaches can also be used.

Referring now to the drawings, FIG. 1 illustrates a system 100 for resource coordination and interference management within a wireless communication system in accordance with various aspects described herein. As FIG. 1 illustrates, system 100 can include one or more Evolved Node Bs (eNBs; also referred to herein as Node Bs, cells or network cells, base stations, access points (APs), etc.) 110, which can communicate with one or more user equipment units (UEs; also referred to herein as access terminals (ATs), mobile terminals, mobile stations, etc.) 120. While only one eNB 110 and UE 120 are illustrated in FIG. 1, it should be appreciated that system 100 can include any number of eNBs 110 and/or UEs 120. Further, it can be appreciated that respective eNBs 110 in system 100 can serve any suitable coverage area, such as an area associated with a macro cell, a femto cell (e.g., an access point base station or Home Node B (HNB)), and/or any other suitable type of coverage area.

In accordance with one aspect, UE 120 can engage in one or more uplink (UL, also referred to herein as reverse link (RL)) communications with eNB 110, and similarly eNB 110 can engage in one or more downlink (DL, also referred to herein as forward link (FL)) communications to UE 120. Additionally or alternatively, Node B 110 and/or UE 120 can engage in any suitable communication(s) with each other, with other devices or entities in system 100, and/or any other suitable entities. In one example, UL and/or DL communication between eNB 110 and UE 120 can additionally result in interference to nearby eNBs, UEs, and/or other devices (not shown). For example, in a system with multiple eNBs 110 and/or UEs 120, a UE located in an area that lies in an overlap between the coverage of multiple eNBs can cause interference to one or more eNBs within range of the UE with which the UE is not communicating, other UEs, and/or other devices under various circumstances. Interference as caused in this manner can be a significant concern in the case of unplanned deployments (such as femto eNBs), where interference can cause significant performance degradation, including outage in some instances.

In view of interference that can be caused within system 100 due to unplanned deployments and/or other causes, respective entities in system 100 can in accordance with one aspect engage in resource coordination to mitigate interference experienced within system 100. For example, respective entities in system 100 can utilize a distributed coordination scheme and/or other suitable schemes, wherein respective eNBs maintain reasonable quality of service (QoS) performance and shared media are utilized in an overall efficient manner. To these ends, eNB 110 can utilize a resource coordination module 112, which can operate to coordinate control resource usage between eNB 110 and UE 120 as described herein to mitigate the effects of interference between entities in system 100. In one example, if eNB 110 and UE 120 are configured to utilize overlapping sets of communication resources in time (e.g., subframes, interlaces, etc.), frequency (e.g., sub-bands, etc.), code, or the like, resource coordination module 112 at eNB 110 can facilitate coordination between the overlapping resources such that interference is minimized between transmissions conducted over the overlapping resources by various entities in system 100.

As further shown in system 100, UE 120 can utilize a reservation request module 122, which can facilitate interference management by requesting power backoff (e.g., a reduction in transmit power or transmit power spectral density (PSD), silence or non-transmission, etc.) by one or more interfering entities on particular frequency sub-bands, subframes or interlaces in time, etc., on which UE 120 is configured for communication with eNB 110 and/or other entities within system 100. Accordingly, by way of specific, non-limiting example, reservation request module 122 at UE 120 can be utilized to enable UE 120 to establish a connection with a serving eNB in the presence of other interfering eNBs. In another example, resource coordination module 112 at eNB 110 can be utilized to coordinate usage of control resources and/or data resources between eNB 110 and UE 120. Techniques that can be implemented by eNB 110 and/or UE 120 for resource control and interference management are described in further detail herein.

Figure 2:
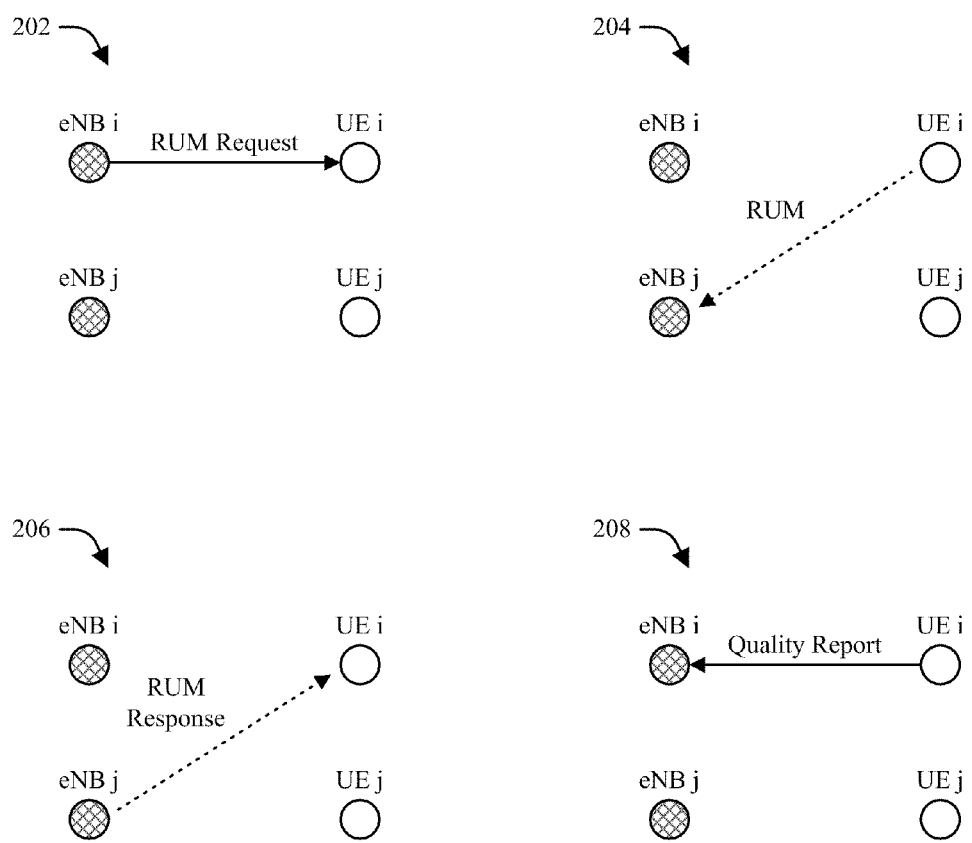
FIGS. 2-3 illustrate respective example procedures for resource coordination in a wireless communication system in accordance with various aspects.

In one example, reservation request module 122 at UE 120 can facilitate interference management within system 100 by generating and communicating resource utilization messages (RUMs) to various entities in system 100. Further, RUM generation and communication can be performed in response to a prompt from an eNB 110 that serves UE 120. For example, as shown by FIG. 2, an eNB can initially provide a RUM request to a UE as illustrated by diagram 202. Next, as illustrated by diagram 204, the UE receiving the RUM request can prepare RUM messaging, which can subsequently be provided to one or more interfering eNBs. RUM messaging transmitted by a UE as shown in diagram 204 can, for example, specify resources on which reservation and/or power backoff is desired. In addition, RUM messaging transmitted as shown in diagram 204 can contain one or more parameters constructed to aid a receiving entity in determining whether to honor the RUM messaging. Specific examples of techniques that can be utilized for constructing and communicating RUM messaging are provided in further detail herein.

Upon receiving a RUM from a UE as shown by diagram 204, an eNB can perform one or more utility-based, priority-based, and/or other computations to determine whether and/or to what extent to honor the RUM. For example, in response to a RUM, an eNB can elect to do nothing (e.g., and continue transmitting at full power), conduct a partial or full power backoff on resources designated in the RUM, and/or perform any other suitable action(s). In one example, an eNB can provide a RUM response to the UE from which the RUM was received that indicates the action(s) elected by the eNB. This is illustrated by diagram 206. Subsequently, the UE can estimate a channel quality that will result based on the action(s) indicated in the RUM response provided as shown by diagram 206. Based on this estimation, the UE can convey a quality report to its serving eNB, as illustrated by diagram 208.

In one example, a RUM can serve as a message transmitted from a given entity (e.g., eNB, UE, etc.) in a wireless communication system that requests respective interferers to the entity to clear particular resources. A RUM can be, for example, a downlink RUM (D-RUM), which can be provided by respective eNBs to clear UL interference. Additionally or alternatively, a RUM can be an uplink RUM (U-RUM), which can be provided by respective UEs to clear DL interference. While various examples provided herein relate specifically to U-RUM or D-RUM generation and management, it should be appreciated that respective techniques as provided herein can be utilized both for U-RUM and D-RUM management. Thus, for example, while not illustrated in FIG. 1, eNB 100 can include a reservation request module 122 that can function as generally described herein with respect to reservation request module 122 at UE 120, and UE 120 can include and/or otherwise utilize a resource coordination module 112 that can operate in a similar manner to a resource coordination module 112 at eNB 110. Further, it should be appreciated that, unless explicitly stated otherwise, the hereto appended claims are not intended to be limited to any such specific implementation(s).

In accordance with another aspect, an eNB 110 and UE 120 as illustrated by system 100 in FIG. 1 can operate according to a dynamic avoidance timeline in order to facilitate resource contention and partitioning, interference management, and/or other performance improvements for system 100. By doing so, it can be appreciated that respective entities in system 100 can be given access to substantially all bandwidth associated with system 100 on a short-term basis as and when needed, thereby mitigating performance degradation associated with traditional network deployments.

Figure 3:
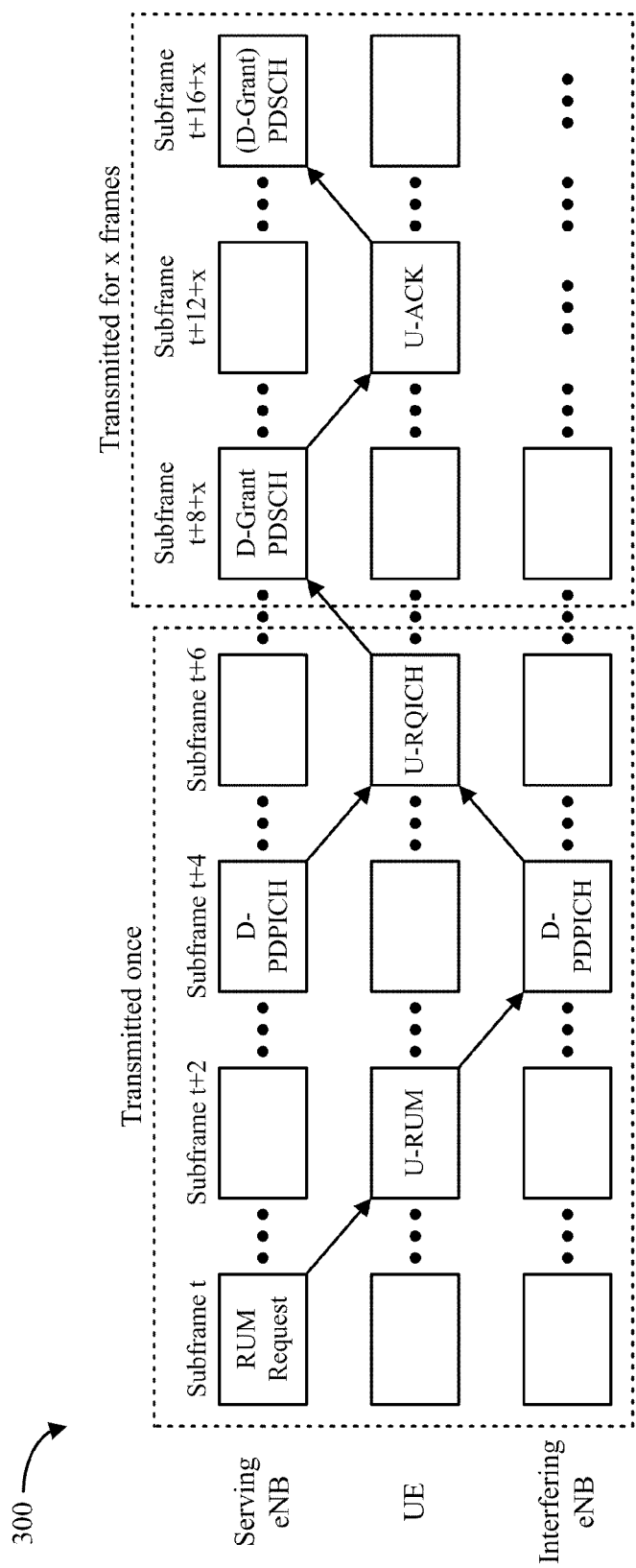

In one example, a dynamic avoidance timeline utilized by eNB 110 and UE 120 can utilize a RUM procedure similar to that illustrated by FIG. 2. Additionally or alternatively, operation of an example dynamic avoidance procedure that can be performed between eNB 110 and UE 120 in time is illustrated by diagram 300 in FIG. 3. As diagram 300 illustrates, a UE, a serving node (or eNB) for the UE, and a node (or eNB) causing interference to the UE can utilize a dynamic interference procedure over a series of subframes. As illustrated in diagram 300, subframes as observed at the UE and respective eNBs are represented as blocks.

As the process illustrated in diagram 300 begins, it can be observed that the serving node of a UE that is experiencing interference from an interfering node can provide a RUM request to the UE at subframe t, which is a request that triggers the following avoidance timeline at the UE. Next, at subframe t+2, the UE can communicate a RUM, such as a U-RUM to the interfering node in response to the RUM request. The RUM can, for example, carry information needed at the interfering eNB to make a decision with respect to whether to honor the RUM. For example, the RUM can carry information relating to the priority of the UE and the traffic with which it will be served, a designated set of affected resources, channel and/or spectral efficiency information (e.g., in order to enable the interfering eNB to determine the short-term impact of allocating the affected resources for the UE as opposed to serving other UEs with the affected resources), or the like. In one example, a UE can obtain at least a portion of information included within a U-RUM from its serving eNB. Thus, for example, portions of the U-RUM that are known at the serving eNB (e.g., resource identifiers, priority information, traffic scheduler metrics, latency metrics for QoS-sensitive traffic, etc.) can be carried by a RUM request from the serving eNB to the UE. The UE can subsequently combine this information with additional information known to the UE, such as cross-link channel characteristics, interference information, or the like, and the combined information can be provided in a RUM to an interfering eNB.

Upon receiving a U-RUM, an interfering eNB can perform respective calculations relating to, for example, comparisons between allocating resources specified in the U-RUM to the requesting UE or serving other UEs with the specified resources. Based on these calculations, the interfering eNB can make a decision regarding whether and/or to what extent to honor the RUM. The decision of the interfering eNB can subsequently be indicated back to the UE at subframe t+4. In one example, the interfering eNB can indicate its decision to the UE via a pilot transmission and/or another suitable transmission. By way of specific example, the transmission of the interfering eNB can be carried out over a power decision pilot indicator channel (PDPICH) and/or another suitable channel. For example, a DL PDPICH (D-PDPICH) can be utilized in response to a U-RUM to indicate a commitment of the power to be utilized on a subsequent transmission (e.g., on resources indicated by the U-RUM), which in turn can allow receivers of the D-PDPICH transmission to estimate the channel quality expected on a particular resource. While D-PDPICH transmission is illustrated in diagram 300, however, it should be appreciated that UL PDPICH (U-PDPICH) transmission can be conducted (e.g., by a UE to an eNB in response to a D-RUM) in a similar manner.

As shown in diagram 300, pilots can be transmitted on D-PDPICH by substantially all eNBs in an associated system, including interfering eNBs and serving eNBs. For example, pilots transmitted on D-PDPICH can serve as an advance notice of an amount of power to be utilized by the corresponding eNB(s) on specified resources at a predetermined time in the future (e.g., 4 subframes later). By doing so, respective UEs can be enabled to make measurements and accurately predict the amount of interference that they will observe at the point in time corresponding to the D-PDPICH transmissions.

Next, at subframe t+6, the UE can perform respective measurements and/or perform other appropriate actions in order to compute per-resource channel quality information. Such computations can, for example, be resource-specific and based on advance notice provided in D-PDPICH transmissions, as opposed to traditional channel quality information (CQI) computations that are averaged over time for all resources. Upon computing resource-specific quality parameters (also referred to herein as resource quality indicators or RQI), the UE can provide the parameters to its serving UE over a RQI channel (e.g., an uplink RQI channel or U-RQICH). In one example, the serving eNB for the UE can utilize RQI transmissions from the UE in performing scheduling, rate prediction, or the like. Further, based on the RQI parameters provided by the UE, the serving eNB can infer whether respective interfering eNBs have honored the RUM provided by the UE. For example, if the RQI reported by the UE is substantially low, the serving eNB can infer that the RUM was not honored. In such a case, the serving eNB can decide not to schedule the UE, or can decide to schedule a different UE experiencing less interference on the given resources, as different UEs can in some circumstances experience different amounts of interference from different eNBs. Alternatively, if the serving eNB deems the RQI reported by the UE acceptable, the serving eNB can proceed with scheduling for the UE.

Subsequent to scheduling by the serving eNB, communication between the UE and its serving eNB can proceed as shown in the remaining subframes in diagram 300 as generally known in the art. For example, the serving eNB for the UE can provide a downlink grant and a physical downlink shared channel (PDSCH) transmission to the UE, based on which the UE can provide an UL acknowledgement (ACK). Subsequently, PDSCH and ACK transmission can continue in the manner provided by diagram 300 for a predetermined number x of radio frames.

As illustrated by diagram 300, it can be appreciated that dynamic avoidance channels (e.g., RUM Request, RUM, etc.) can be sent only once to negotiate resources between respective network entities on substantially all interlaces. Subsequently, channels such as grants, ACK, etc., can be sent on all interlaces. In one example, coordination between network entities as illustrated by system 300 can be a single subframe and pipelined for substantially all scheduled subframes. Alternatively, coordination can be performed for a longer priority period (e.g., a fixed number of subframes, a fixed time period, etc.). In another example, a predefined amount of latency can be allowed in the timeline illustrated by diagram 300 for resource negotiation, processing time, or the like.

Figure 4:
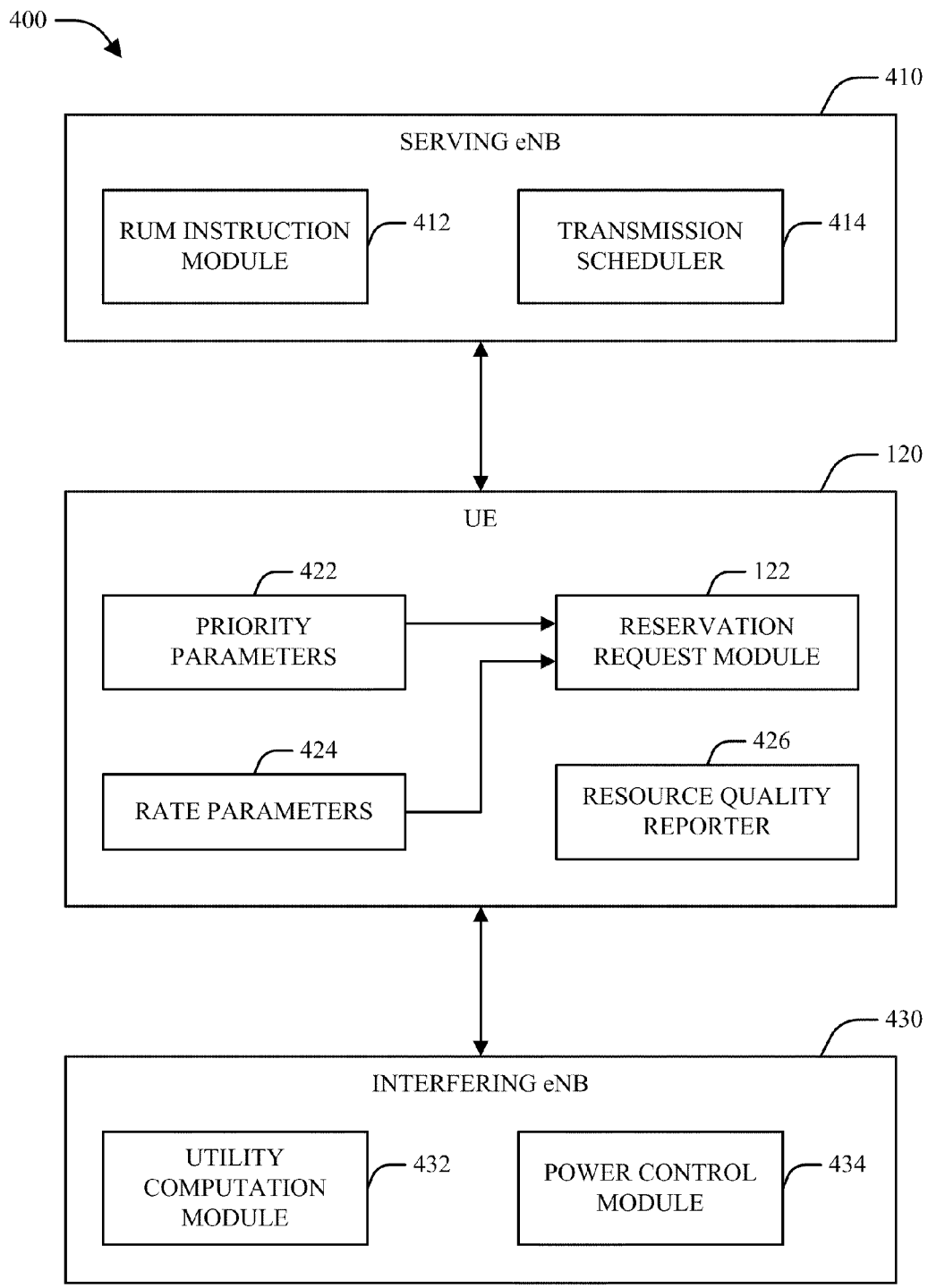
FIG. 4 is a block diagram of a system for generating and utilizing resource utilization messages for wireless interference management in accordance with various aspects.

Turning next to FIG. 4, a block diagram of a system 400 for generating and utilizing resource utilization messages for wireless interference management in accordance with various aspects is illustrated. As shown in system 400, a UE 120 can interact with respective eNBs, such as a serving eNB 410 and an interfering eNB 430. As shown in system 400 and described herein, various techniques for DL resource management in a scenario where each UE 120 is associated with one serving eNB 410 (e.g., where there is no notion of scheduling among UEs associated with a sector, etc.) are provided. However, it should be appreciated that the techniques described herein can be extended to UL resource management and/or multi-eNB deployments, and that unless explicitly stated otherwise the claimed subject matter is not intended to be limited to any particular implementation(s).

In accordance with one aspect, system 400 can approach resource management as a distributed optimization problem that utilizes a utility function that converts priority parameters, spectral efficiency parameters, and the like into scalar values that can be compared and maximized. In one example, memoryless algorithms are utilized that avoid making inferences relating to "average" states of respective users explicitly or implicitly (e.g., such that responses are based only upon a current priority, rate, etc.). It can be appreciated that algorithms as provided herein enable robust resource management that can work for any network topology, size, geometry, or utility function(s). For example, a changing utility function can be utilized to effectively control fairness.

In general, it can be further appreciated that system 400 can facilitate resource control by adjusting transmit powers associated with respective links (e.g., transmitter/receiver pairs) in system 400 such that an overall utility (e.g., expressed in terms of rate, priority, or the like) associated with system 400 is maximized. For example, system 400 can be configured such that a link yields to another link only if yielding would lead to an improvement in net utility. In one example, respective links in system 400 can manage resources based only on instantaneous information relating to the QoS of other links, thereby enhancing support for handling bursty and/or delay-sensitive traffic. Further, to enhance decentralized resource control operation, system 400 can impose controls that prohibit excessive power backoff, facilitate randomization, and/or further other appropriate ends.

Figure 5:
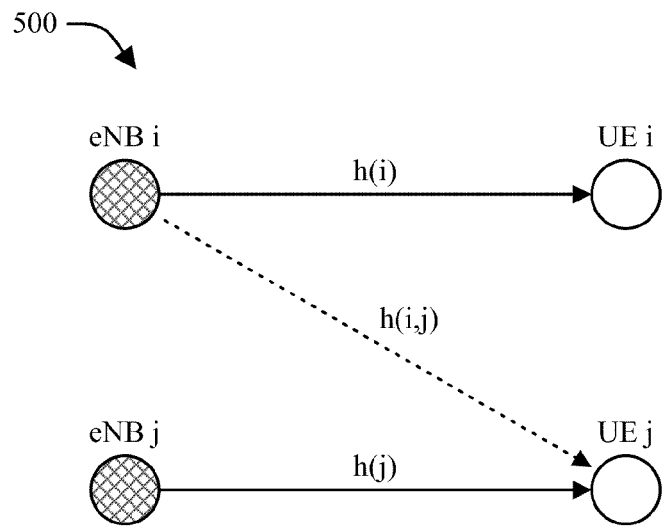
FIG. 5 illustrates example channel characteristics between respective entities in a wireless communication system in accordance with various aspects.

In the following description, specific, non-limiting examples of techniques that can be utilized by system 400 for interference and resource management are provided. It should be appreciated, however, that the examples provided herein are not intended as an exhaustive listing of the implementations that can be utilized for carrying out such ends. With regard to the below examples, the following notations and definitions apply. It is reiterated that the following definitions and notations are provided merely by way of illustration and are not intended to limit the scope of the subject matter claimed herein. As utilized herein, system 400 can be configured to include N eNBs and N UEs such that exactly one UE is associated with each eNB. Thus, system 400 can be associated with N links, denoted as links $\{1, \ldots, N\}$. Further, channel gain is denoted as $h(\ )$, where $h(i)$ denotes channel gain from an i-th eNB to an i-th UE, $h(i,j)$ denotes channel gain from an i-th eNB to a j-th UE, and $h(j)$ denotes channel gain from a j-th eNB to a j-th UE. These relationships are illustrated by diagram 500 in FIG. 5. As further utilized herein, $P_{max}(i)$ is the maximum transmit power of an i-th eNB. Further, an i-th eNB can transmit at M power levels given by $\{P_1(i), \ldots P_M(i) = P_{max}(i)\}$. In addition, each UE can be associated with a utility function of its average rate, priority, and/or other suitable parameters, which can be denoted as $U_i(x_i)$ for an i-th UE. Thus, the goal of a distributed algorithm as implemented by system 400 can be to maximize the overall utility of system 400, which can be denoted as $$\sum_{i=1}^{N} U_i(x_i),$$

with low overhead.

In accordance with one aspect as illustrated by system 400, UE 120 can utilize a reservation request module 122 to facilitate resource control and interference management in relation to a communication link between serving eNB 410 and UE 120. For example, reservation request module 122 can identify one or more priority parameters 422 and/or one or more rate parameters 424 associated with a communication link associated with UE 120 and its serving eNB 410. In addition, reservation request module 122 can identify a designated set of resources for communication via the communication link. Based on these identified parameters, reservation request module 122 can construct a RUM that includes a request for reduction of transmit power at one or more interfering eNBs 430 on the designated set of resources as well as a function of the one or more priority parameters 422 and/or the one or more rate parameters 424. Upon construction of a RUM, UE 120 can communicate the RUM to at least one interfering network node, such as interfering eNB 430.

In one example, serving eNB 410 can utilize a RUM instruction module 412 and/or other suitable means to transmit a RUM request to UE 120 as generally described above. Upon receipt of a RUM request, UE 120 can construct and communicate a RUM in various manners as set forth in further detail herein.

In accordance with another aspect, UE 120 can construct RUMs for transmission to various interfering eNBs 430 using various sets of information. By way of a first specific, non-limiting example, a RUM generated by UE 120 can include two terms, including a first term given as an incremental scheduler metric function U'(x(i)) of the average or cumulative rate presently achieved by the UE 120 (e.g., as provided by rate parameters 424) and a second term that indicates a maximum transmit power of serving eNB 410 multiplied by a channel gain from serving eNB 410 to UE 120 in relation to a nominal interference value $I_{nom}(i)$. Accordingly, a RUM prepared by UE 120 can be expressed as $$\left(U'(x(i)), \frac{P_{max}(i)h(i)}{I_{nom}(i)}\right).$$

As used herein, the nominal interference value $I_{nom}(i)$ corresponds to an interference that link i (e.g., corresponding to an i-th serving eNB 410 and UE 120) would expect to observe if all other transmitters (e.g., interfering eNBs 430) back off as expected in response to the corresponding RUM. Accordingly, in one example, UE 120 can compute the nominal interference value $I_{nom}(i)$ at least in part by predicting a total amount of interference caused by at least one interfering eNB 430 in the event that the corresponding RUM is accepted by substantially all interfering eNBs 430.

In another example, UE 120 can be configured to communicate a RUM at a transmit power determined as a function of the maximum transmit power of serving eNB 410 and the channel gain between serving eNB 410 and UE 120. Thus, for example, UE 120 can modulate information relating to a communication link between serving eNB 410 and UE 120 in the power of a communicated RUM by selecting RUM transmit power to be inversely proportional to channel gain. More particularly, an i-th UE 120 can conduct RUM signaling at a transmit power $$P_{RUM}(i) = \frac{K}{h(i)P_{max}(i)}$$

for a system-wide known constant K, based on which a j-th interfering eNB 430 can receive the RUM signaling with power $$P_{RX}(i) = \frac{Kh(i, j)}{h(i)P_{max}(i)}.$$

Additionally or alternatively, information relating to channel gain and/or other suitable parameters can be explicitly provided (e.g., in the payload of the RUM signaling). Subsequently, based on implicit and/or explicit information associated with received RUM signaling, a j-th interfering eNB 430 can infer $$\log\left(1 + \frac{h(i)P_{max}(i)}{I_{nom}(i)}\right), \quad \log\left(1 + \frac{h(i)P_{max}(i)}{h(i, j)P_{max}(j) + I_{nom}(i)}\right),$$

or the like.

In an additional example RUM configuration, UE 120 can be configured (e.g., in the case of QoS-sensitive traffic) to incorporate respective QoS metrics and/or other priority parameters 422 into RUM signaling in addition to, and/or in place of, rate parameters 424 as described above. Thus, for example, the incremental scheduler metric function U'(x(i)) as described above can be replaced with a function of respective priority metrics relating to QoS- and/or delay-sensitive traffic. These parameters can include, for example, a head-of-line delay $D_{HOL}$ corresponding to a packet flow associated with a communication link between serving eNB 410 and UE 120, a queue length q corresponding to such a packet flow, a burst size S of such a packet flow, a delay target $D_{TARG}$ for such a packet flow, an average rate at which an associated communication link has been served (e.g., at one or more times in the past), and/or other suitable parameters. Thus, by way of illustration, U'(x(i)) can be replaced with a function $f(D_{HOL}, q, s, D_{TARG})$ and/or another suitable function of respective priority parameters 422 of interest. By way of specific example, a function $f(q_i, D_i)$ or $f(q_i, D_i)r_i$ can be utilized as a utility function for resource management in relation to an i-th eNB/UE link, where $q_i$ represents buffer length for an i-th UE, $D_i$ represents head-of-line delay for the i-th UE, and $r_i$ represents the spectral efficiency achievable on the link between the i-th UE and its serving eNB. By utilizing QoS-driven priority parameters 422 as a basis for interference management in this manner, it can be appreciated that system 400 can facilitate queue stabilization, improved delay performance, and other suitable benefits even in the presence of time-varying ergodic channels.

In accordance with one aspect, UE 120 can generate and transmit respective RUMs to one or more interfering eNBs 430 as described above. Subsequently, an interfering eNB 430 can obtain respective RUMs requesting power backoff on a specified set of resources and utilize a utility computation module 432, a power control module 434, and/or other suitable means to determine an extent of power backoff to be performed on the specified set of resources based on the respective RUMs and parameters associated with the respective RUMs.

By way of specific example, respective RUMs received by an interfering eNB 430 can comprise one or more parameters that are constructed as a function of at least one priority metric (e.g., associated with priority parameters 422). Thus, for example, a RUM received at interfering eNB 430 can be constructed in a similar manner to that described above, e.g., (f(q$_i$, D$_i$), $$\frac{P_{max}(i)h(i)}{I_{nom}(i)},$$

Resource), to convey information relating to priority metrics associated with a link between an i-th serving eNB 410 and an i-th UE 120, power/interference parameters, and the identity (-ies) of the resource(s) on which the RUM is requesting power backoff. While the specific function f(q$_i$, D$_i$) is utilized herein, it should nonetheless be appreciated that any suitable function of priority metrics, such as head-of-line delays, queue lengths, burst sizes, delay targets, average past rates, etc., corresponding to respective packet flows associated with respective communication links, and/or any other suitable metric(s), could be utilized.

Based on the specific, non-limiting example RUM structure provided above, interfering eNB 430 can determine whether and to what extent to perform power backoff on the resource(s) specified in the RUM in a variety of manners. In a first example, a binary approach can be utilized, wherein interfering eNB 430 can compute a first QoS change associated with silencing communication on the specified set of resources provided in a RUM and a second QoS change associated with performing no power backoff on the specified set of resources (e.g., transmitting at a maximum transmit power $P_{max}(i)$) on the specified set of resources). For example, the first QoS change can be expressed as follows:

$$\Delta U(0) = \max_{i \in [RUMs\,decoded]} f(q_i, D_i)\log\left(1 + \frac{h(i)P_{max}(i)}{I_{nom}(i)}\right),$$

and the second QoS change can be expressed as follows:

$$\Delta U(P_{max}(i)) = f(q_i, D_i)\log\left(1 + \frac{h(j)P_{max}(i)}{I}\right) + $$
$$\max_{i \in [RUMs decoded]} f(q_i, D_i)\log\left(1 + \frac{h(i)P_{max}(i)}{h(i,j)P_{max}(j) + I_{nom}(i)}\right),$$

where I is set to $I_{nom}(j)$ if a j-th UE has provided a RUM and reuse-one interference otherwise. Upon performing the above computations, power control module 434 and/or other suitable mechanisms associated with interfering eNB 430 can determine whether or not to back off in power based on the utility increase or QoS change that is higher. For example, interfering eNB 430 can be configured to grant a corresponding RUM at least in part by silencing transmission on a specified set of resources associated with the RUM upon determining that the first QoS change as provided above is greater than the second QoS change. Alternatively, interfering eNB 430 can be configured to deny the RUM at least in part by performing substantially no power backoff on the set of resources specified by the RUM upon determining that the second QoS change is greater than the first QoS change.

In another example, a similar binary technique to that provided above can be utilized by interfering eNB 430 in the event that RUM signaling provided by one or more UEs 120 is given in terms of rate parameters 424, e.g., (U'(x(i)), $$\frac{P_{max}(i)h(i)}{I_{nom}(i)},$$

Resource). For example, utility computation module 432 and/or other suitable mechanisms at interfering eNB 430 can compute a first change in utility that corresponds to a total utility achievable within system 400 in the event that interfering eNB 430 does not communicate on requested resources and a second change in utility that corresponds to a combined utility within system 400 resulting from transmission by both interfering eNB 430 and serving eNB 410 on the requested resources (e.g., in terms of an increased utility for interfering eNB 430 offset by a decreased utility for serving eNB 410). These metrics can be computed as follows:

$$\Delta U(0) = \max_{i \in [RUMsdecoded]} U'(x(i))\log\left(1 + \frac{h(i)P_{max}(i)}{I_{nom}(i)}\right),$$
$$\Delta U(P_{max}(i)) = U'(x(j))\log\left(1 + \frac{h(j)P_{max}(i)}{I}\right) + $$
$$\max_{i \in [RUMsdecoded]} U'(x(i))\log\left(1 + \frac{h(i)P_{max}(i)}{h(i,j)P_{max}(j) + I_{nom}(i)}\right),$$

where I is set to $I_{nom}(j)$ if a j-th UE has provided a RUM and reuse-one interference otherwise. Based on the results of such calculations, interfering eNB 430 can be configured to conduct full backoff or no backoff in a similar manner to that described above.

In accordance with another aspect, interfering eNB 430 can alternatively compute QoS and/or utility changes associated with a plurality of power backoff levels on a RUM-specified set of resources, such that interfering eNB 430 can back off power on the RUM-specified set of resources according to a power backoff level determined to have a highest QoS and/or utility change from among the plurality of power backoff levels. In one example, in a scenario where multiple transmit power levels P∈{P$_1$(j), . . . , P$_M$(j)} are allowed at a j-th interfering eNB 430, interfering eNB 430 can compute respective utility changes associated with respective power levels P as follows:

$$\Delta U(P) = \max_{i \in [RUMs\,decoded]} U'(x(i))\log\left(1 + \frac{h(i)P_{max}(i)}{h(i,j)P + I_{nom}(i)}\right) + $$
$$I_{[UE\,j\,sent\,RUM]}U'(x(j))\log\left(1 + \frac{h(j)P}{I_{nom}(j)}\right) + $$
$$I_{[UE\,j\,did\,not\,RUM]}U'(x(j))\log\left(1 + \frac{h(j)P}{I_{reuse-one}}\right).$$

Based on the above calculations, interfering eNB 430 can select a transmit power given by P=arg max$_{P_1(j), \ldots, P_M(j)} \Delta U$(P). Similarly, by substituting f(q$_i$, D$_i$) and/or a similar function of priority and/or QoS metrics for U'(x(i)) in the above computations, power backoff selection can additionally or alternatively be performed based on priority parameters 422.

As further noted above, RUMs provided by respective UEs 120 to an interfering eNB 430 can include parameters relating to maximum transmit powers of respective serving eNBs 410 to the UEs 120, parameters relating to channel gain associated with respective communication links between the UEs 120 and their respective serving eNBs 410, nominal interference parameters, or the like. In one example, interfering eNB 430 can be further configured to identify such parameters and/or one or more other suitable parameters associated within a RUM based on a received power of the RUM. By way of example, in the event that cross-channel gain is encoded into the power of a transmitted RUM, a receiver of the RUM can compute the rate for an i-th link based on a transmit power P of a j-th link based on $$\log\left(1 + \frac{h(i)P_{max}(i)}{h(i,j)P + I_{nom}(i)}\right) = \log\left(1 + \frac{1}{\frac{h(i,j)}{h(i)P_{max}(i)}P + \frac{I_{nom}(i)}{h(i)P_{max}(i)}}\right).$$

Additionally or alternatively, it can be appreciated that cross-channel gain can be encoded into the payload of RUM signaling. In one example, the manner in which gain information is incorporated into RUM signaling can depend on how the signaling is transmitted. For example, unicast RUM signaling can include explicitly encoded gain information broadcast RUM signaling can include power-modulated gain information.

In accordance with a further aspect, upon determining an extent of power backoff to be applied on resources specified by respective RUMs, interfering eNB 430 can signal the extent of power backoff to be performed on the specified set of resources in a pilot transmission to UE(s) 120. Upon receiving such pilot signaling from at least one interfering eNB 430 (e.g., in response to a RUM provided to the at least one interfering eNB 430), UE 120 can estimate channel quality associated with a designated set of resources based at least in part on the pilot signaling. Subsequently, a resource quality reporter 426 and/or other means at UE 120 can be utilized to report estimated channel quality associated with the designated set of resources to serving eNB 410, which in turn can utilize a transmission scheduler 414 to schedule communication between serving eNB 410 and UE 120 based on the reported information.

In accordance with still another aspect, RUM generation and/or signaling for QoS traffic as generally described above can be based on arrival processes associated with respective packets corresponding to UE 120. For example, packets can arrive at UE 120 according to one or more arrival processes corresponding to an arrival rate that can be independent of scheduling processes associated with UE 120. Further, respective statistics of the arrival process(es) associated with UE 120 may or may not be known by UE 120. By utilizing the techniques described above for such a system, it can be appreciated that the overall performance of UE 120 can be improved by, for example, reducing tail delays, stabilizing queues (e.g., by controlling delays and buffer sizes, etc.), and/or achieving other appropriate ends.

Figure 6:
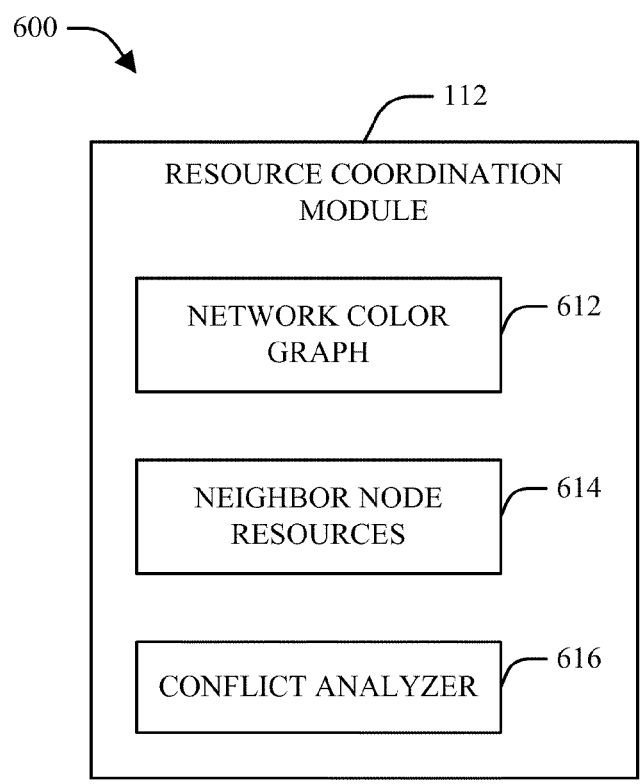
FIG. 6 illustrates an example system for resource contention management in a wireless communication environment that can be employed in accordance with various aspects described herein.

Referring now to FIG. 6, an example system 600 for resource contention management in a wireless communication environment that can be employed in accordance with various aspects described herein is illustrated. As shown in FIG. 6, system 600 can include a resource coordination module 112, which can be incorporated by a UE (e.g., UE 120), an eNB (e.g., eNB 110), and/or any other network entity to facilitate resource coordination. In one example, resource coordination module 112 can facilitate the generation of and/or otherwise include a network color graph 612, which can be utilized in combination with information relating to neighbor node resources 614 and/or a conflict analyzer 616 to efficiently manage resources associated with system 600. In accordance with various aspects, network color graph 612 can be leveraged by resource coordination module 112 to mitigate effects associated with non-consensus scenarios resulting from the use of distributed resource management algorithms.

In accordance with one aspect, a two-link system can be considered, wherein transmission of a first link interferes with a second link such that the two links should not request the same resource unless both links have a significant amount of data to transmit. In such a system, resource coordination module 112 can facilitate basic conflict avoidance through the generation of an interference graph or network color graph 612. In one example, respective network nodes represented by network color graph 612 can be colored such that two nodes connected by an edge do not have the same color. Such an algorithm can facilitate a resource granularity of, for example, two multiplied by the degree of network color graph 612. In one example, distributed algorithms can be utilized for coloring network color graph 612.

Based on network color graph 612 and neighbor node resources 614, some or all resources associated with system 600 can be statically or semi-statically assigned to respective nodes and/or links in system 600 such that a link operating according to conflict analyzer 616 can first request resources corresponding to its own color. If no such resources are available, resources not belonging to the link's neighbors can be utilized. Next, remaining resources can be requested in decreasing order of conflict.

Figure 7:
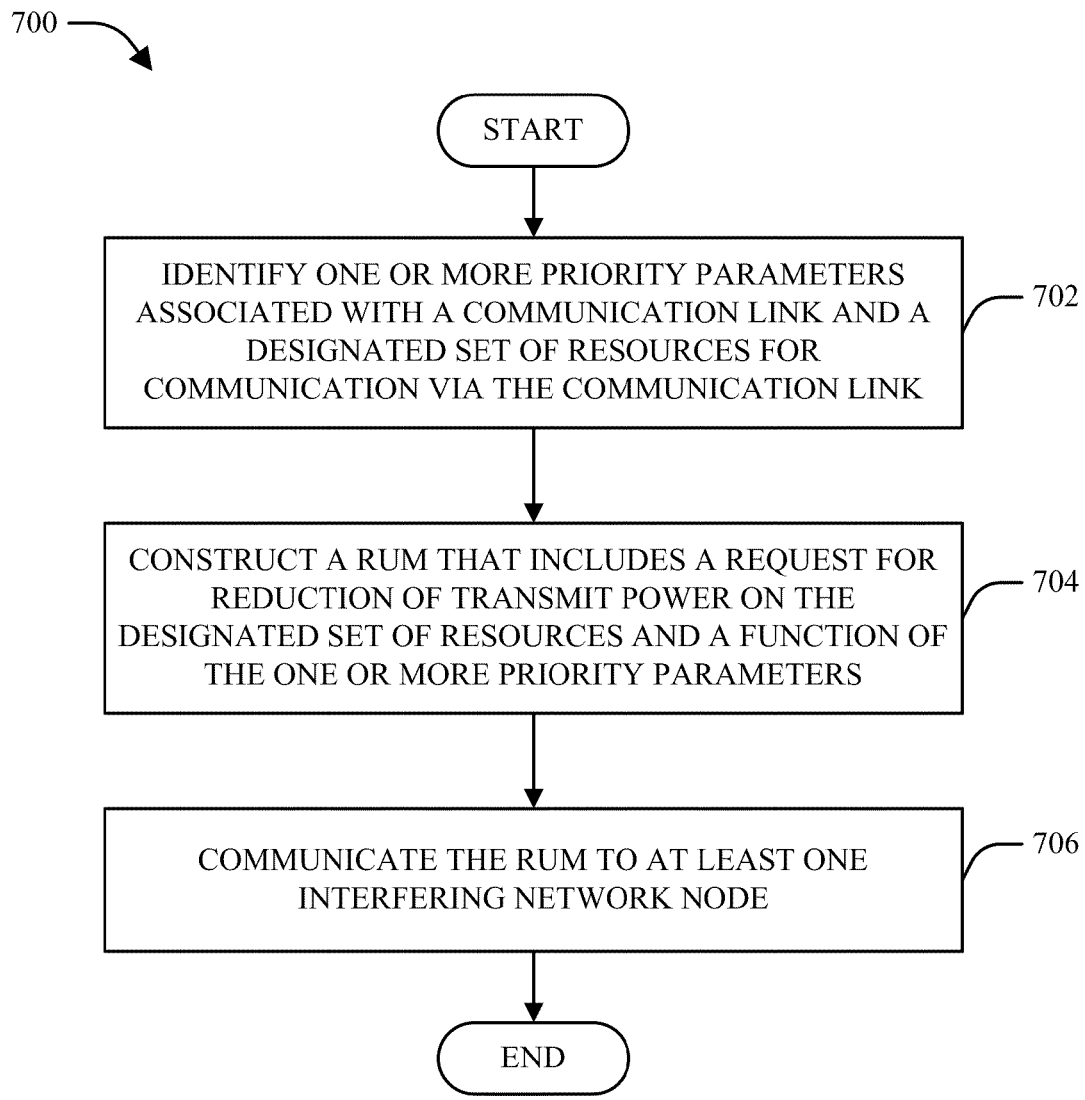
FIGS. 7-8 are flow diagrams of respective methodologies for generating and transmitting signaling for interference management in a wireless communication system.
Figure 8:
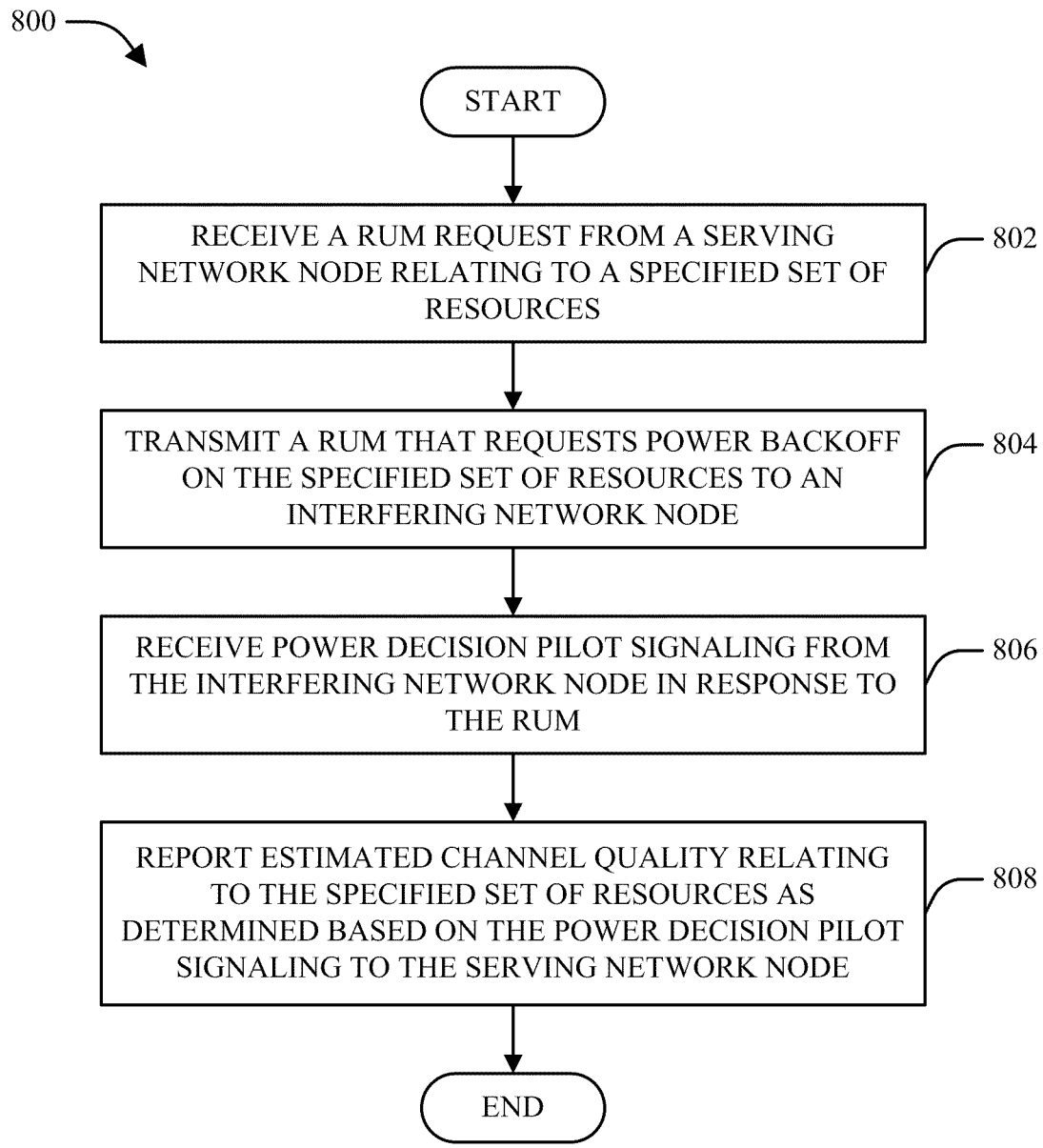
Figure 9:
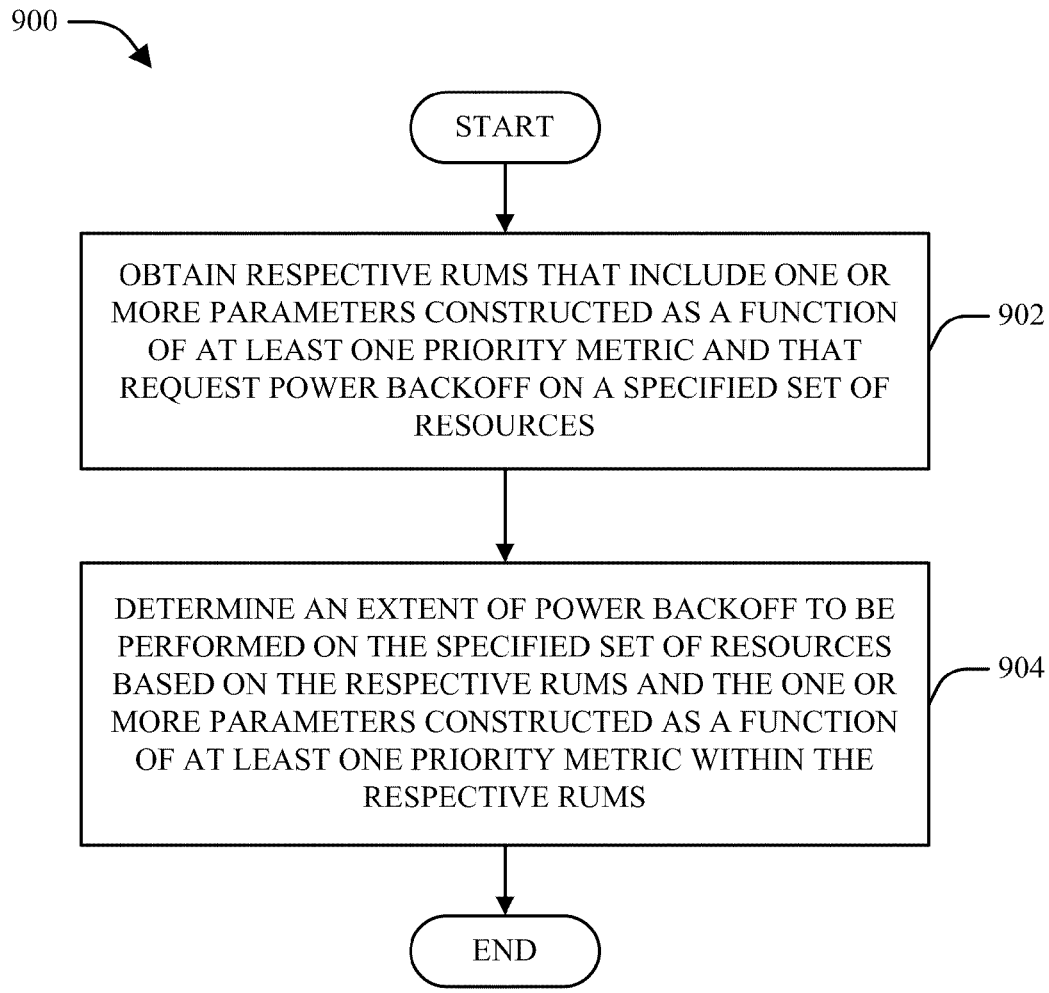
FIG. 9 is a flow diagram of a methodology for processing resource utilization messaging in association with resource and interference management for a wireless communication system.

Referring now to FIGS. 7-9, methodologies that can be performed in accordance with various aspects set forth herein are illustrated. While, for purposes of simplicity of explanation, the methodologies are shown and described as a series of acts, it is to be understood and appreciated that the methodologies are not limited by the order of acts, as some acts can, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

With reference to FIG. 7, illustrated is a methodology 700 for generating and transmitting signaling for interference management in a wireless communication system. It is to be appreciated that methodology 700 can be performed by, for example, an eNB (e.g., eNB 110), a UE (e.g., UE 120), and/or any other appropriate network entity. Methodology 700 begins at block 702, wherein one or more priority parameters (e.g., priority parameters 422) associated with a communication link and a designated set of resources for communication via the communication link are identified. Next, at block 704, a RUM is constructed (e.g., by a reservation request module 122) that includes a request for reduction of transmit power on the designated set of resources and a function of the one or more priority parameters identified at block 702. Methodology 700 can then conclude at block 706, wherein the RUM constructed at block 704 is communicated to at least one interfering network node.

Turning now to FIG. 8, a flow diagram of another methodology 800 for generating and transmitting signaling for interference management in a wireless communication system is illustrated. Methodology 800 can be performed by, for example, a wireless terminal device and/or any other appropriate network entity. Methodology 800 begins at block 802, wherein a RUM request is received from a serving network node (e.g., from a serving eNB 410 via a RUM instruction module 412) that relates to a specified set of resources. At block 804, a RUM is transmitted to an interfering network node (e.g., interfering eNB 430) that requests power backoff on the specified set of resources. Next, at block 806, power decision pilot signaling is received from the interfering network node in response to the RUM transmitted at block 804. Finally, at block 808, estimated channel quality relating to the specified set of resources as determined based on the power decision pilot signaling to the serving network node received at block 806 is reported (e.g., via a resource quality reporter 426).

FIG. 9 illustrates a methodology 900 for processing resource utilization messaging in association with resource and interference management for a wireless communication system. Methodology 900 can be performed by, for example, an eNB, a UE, and/or any other suitable network entity. Methodology 900 begins at block 902, wherein respective RUMs are obtained that include one or more parameters constructed as a function of at least one priority metric and that request power backoff on a specified set of resources. Methodology 900 can then conclude at block 904, wherein an extent of power backoff to be performed on the specified set of resources included in the RUMs received at block 902 is determined (e.g., by a utility computation module 432 and/or a power control module 434) based on the respective RUMs and respective parameters, such as the one or more parameters constructed as a function of at least one priority metric, provided within the respective RUMs.

Figure 10:
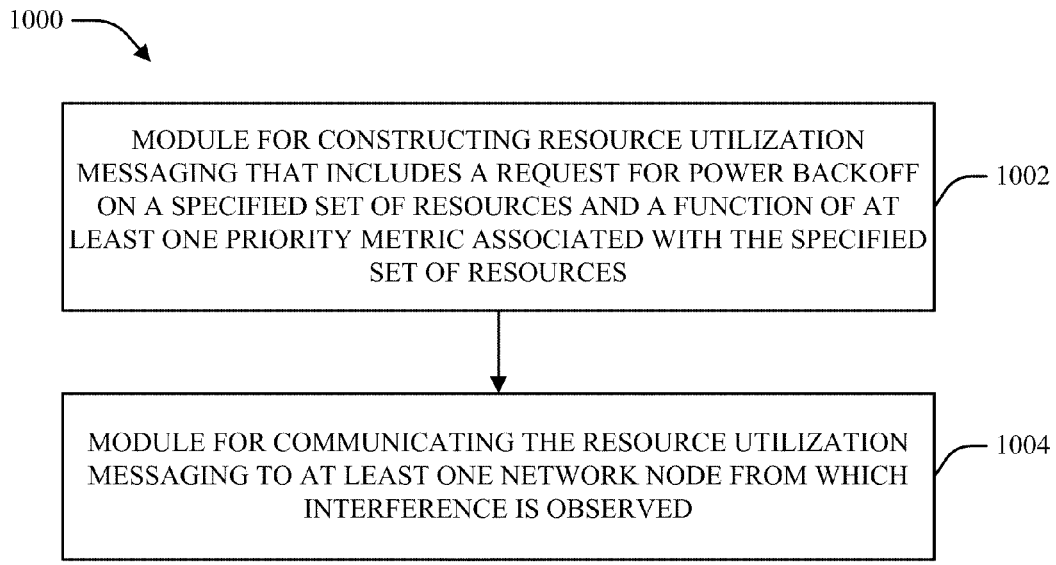
FIGS. 10-11 are block diagrams of respective apparatuses that facilitate resource coordination and interference management in a wireless communication network.
Figure 11:
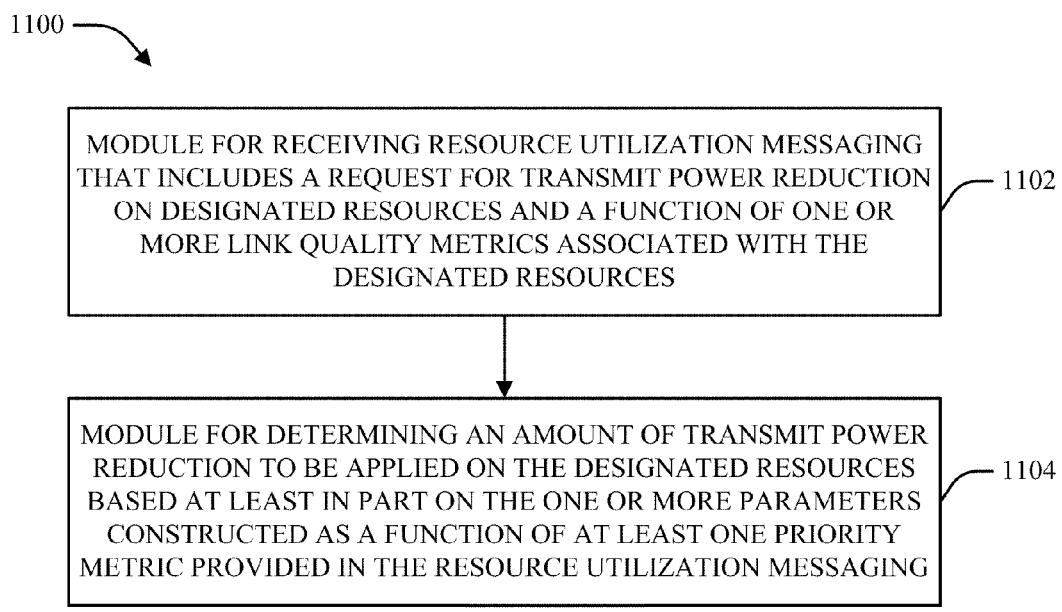

Referring next to FIGS. 10-11, respective apparatuses 1000-1100 that can be utilized to facilitate various aspects described herein are illustrated. It is to be appreciated that apparatuses 1000-1100 are represented as including functional blocks, which can be functional blocks that represent functions implemented by a processor, software, or combination thereof (e.g., firmware).

With reference first to FIG. 10, an apparatus 1000 that facilitates resource coordination and interference management in a wireless communication network is illustrated. Apparatus 1000 can be implemented by an eNB (e.g., eNB 110), a UE (e.g., UE 120), and/or any other suitable network entity and can include a module 1002 for constructing resource utilization messaging that includes a request for power backoff on a specified set of resources and a function of at least one priority metric associated with the specified set of resources and a module 1004 for communicating the resource utilization messaging to at least one network node from which interference is observed.

FIG. 11 illustrates another apparatus 1100 that facilitates resource coordination and interference management in a wireless communication network. Apparatus 1100 can be implemented by a Node B, a terminal, and/or any other suitable network entity and can include a module 1102 for receiving resource utilization messaging that includes a request for transmit power reduction on designated resources and a function of one or more link quality metrics associated with the designated resources and a module 1104 for determining an amount of transmit power reduction to be applied on the designated resources based at least in part on the one or more parameters constructed as a function of at least one priority metric provided in the resource utilization messaging.

Figure 12:
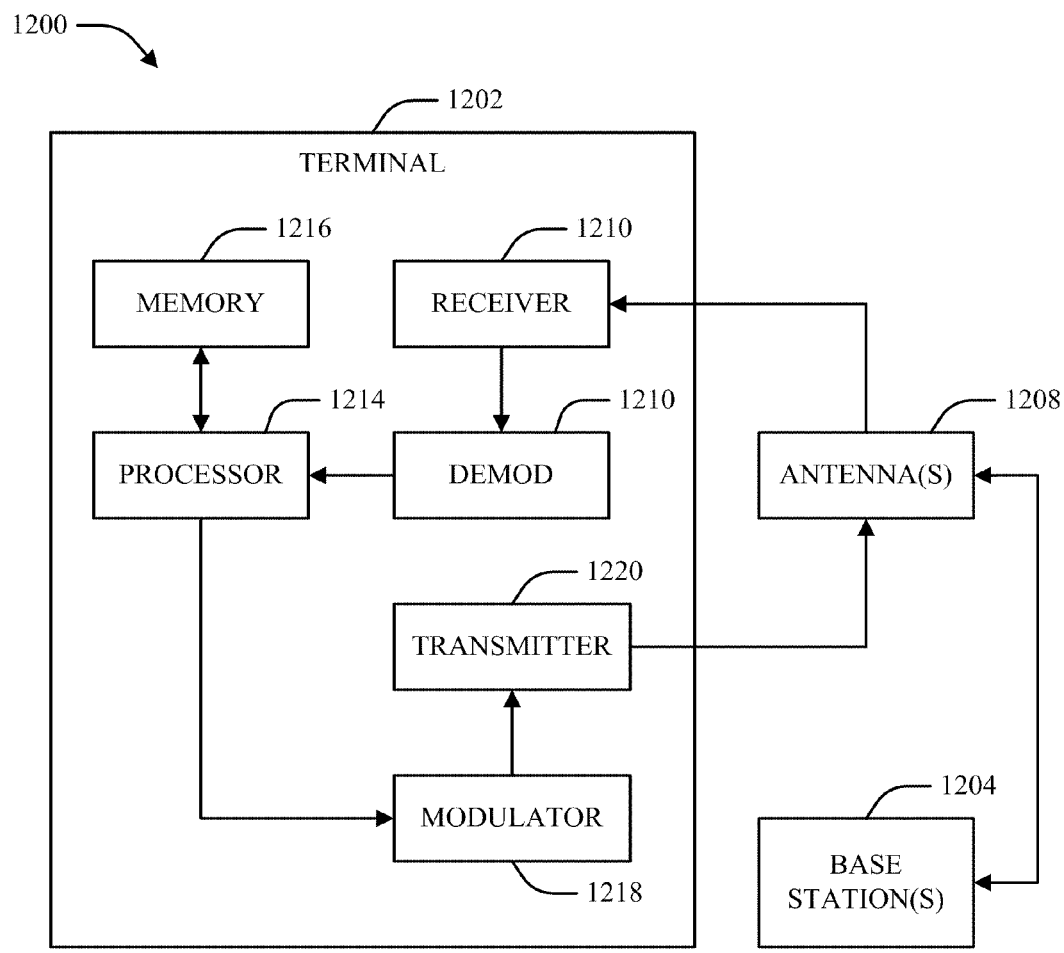
FIGS. 12-13 are block diagrams of respective wireless communication devices that can be utilized to implement various aspects described herein.

FIG. 12 is a block diagram of a system 1200 that can be utilized to implement various aspects of the functionality described herein. In one example, system 1200 includes a mobile terminal 1202. As illustrated, mobile terminal 1202 can receive signal(s) from one or more base stations 1204 and transmit to the one or more base stations 1204 via one or more antennas 1208. Additionally, mobile terminal 1202 can comprise a receiver 1210 that receives information from antenna(s) 1208. In one example, receiver 1210 can be operatively associated with a demodulator (Demod) 1212 that demodulates received information. Demodulated symbols can then be analyzed by a processor 1214. Processor 1214 can be coupled to memory 1216, which can store data and/or program codes related to mobile terminal 1202. Additionally, mobile terminal 1202 can employ processor 1214 to perform methodologies 700-900 and/or other similar and appropriate methodologies. Mobile terminal 1202 can also include a modulator 1218 that can multiplex a signal for transmission by a transmitter 1220 through antenna(s) 1208.

Figure 13:
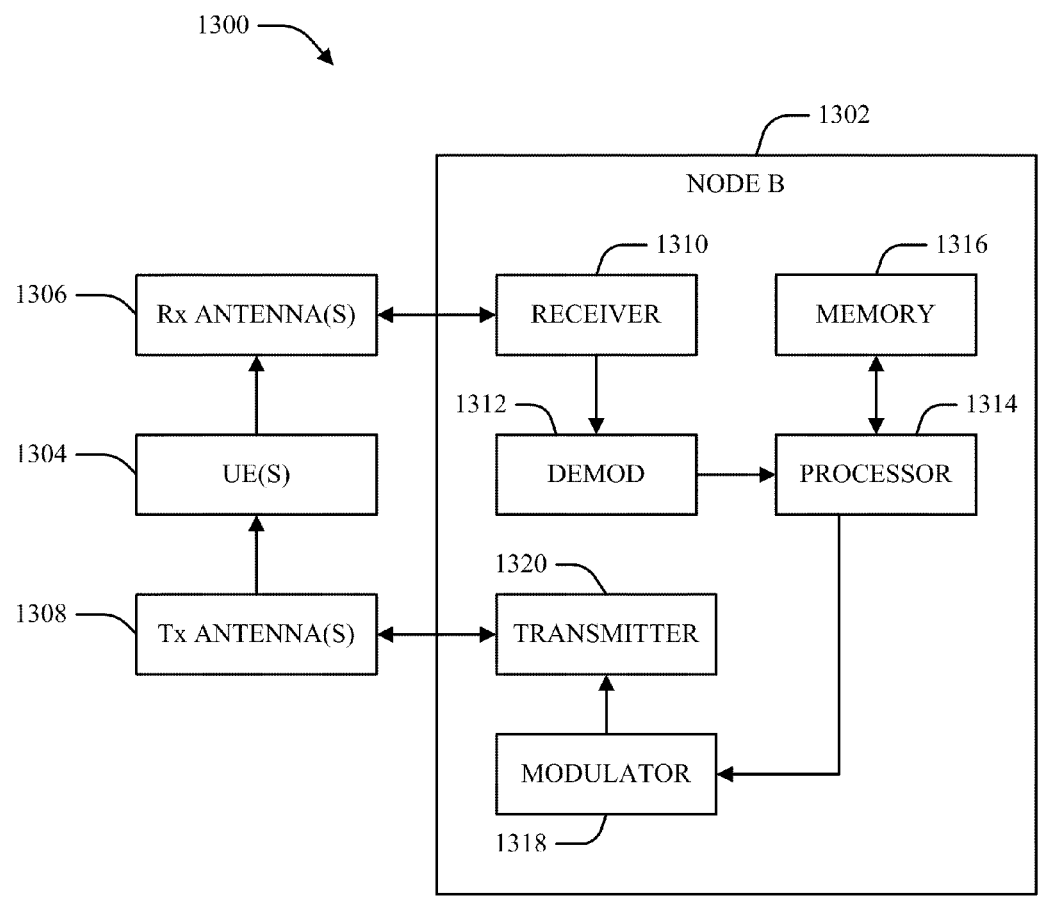

FIG. 13 is a block diagram of another system 1300 that can be utilized to implement various aspects of the functionality described herein. In one example, system 1300 includes a base station or Node B 1302. As illustrated, Node B 1302 can receive signal(s) from one or more UEs 1304 via one or more receive (Rx) antennas 1306 and transmit to the one or more UEs 1304 via one or more transmit (Tx) antennas 1308. Additionally, Node B 1302 can comprise a receiver 1310 that receives information from receive antenna(s) 1306. In one example, the receiver 1310 can be operatively associated with a demodulator (Demod) 1312 that demodulates received information. Demodulated symbols can then be analyzed by a processor 1314. Processor 1314 can be coupled to memory 1316, which can store information related to code clusters, access terminal assignments, lookup tables related thereto, unique scrambling sequences, and/or other suitable types of information. Additionally, mobile terminal 1302 can employ processor 1313 to perform methodology 700, methodology 900, and/or other similar and appropriate methodologies. Node B 1302 can also include a modulator 1318 that can multiplex a signal for transmission by a transmitter 1320 through transmit antenna(s) 1308.

Figure 14:
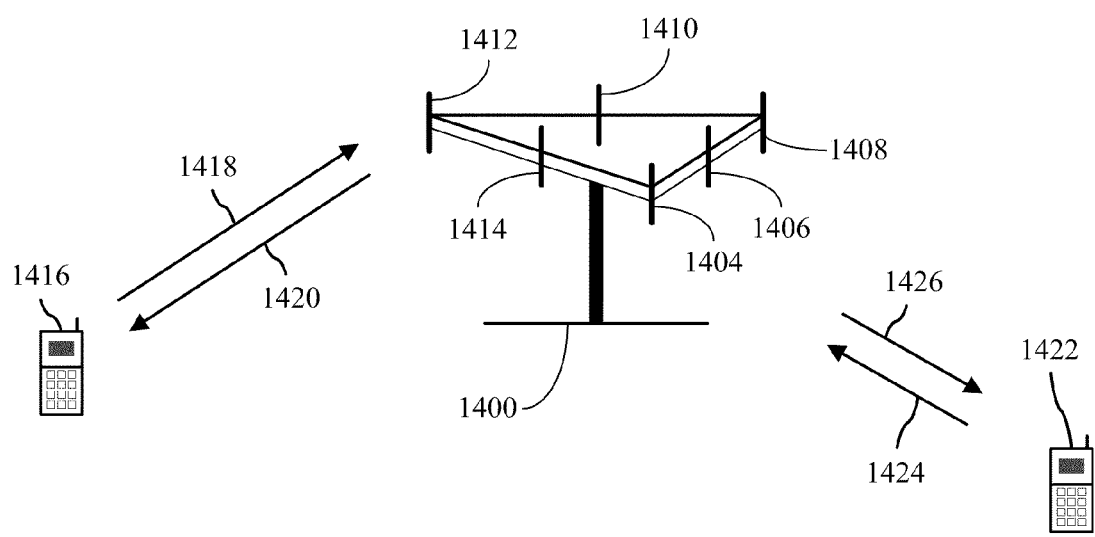
FIG. 14 illustrates a wireless multiple-access communication system in accordance with various aspects set forth herein.

Referring now to FIG. 14, an illustration of a wireless multiple-access communication system is provided in accordance with various aspects. In one example, an access point 1400 (AP) includes multiple antenna groups. As illustrated in FIG. 14, one antenna group can include antennas 1404 and 1406, another can include antennas 1408 and 1410, and another can include antennas 1412 and 1414. While only two antennas are shown in FIG. 14 for each antenna group, it should be appreciated that more or fewer antennas may be utilized for each antenna group. In another example, an access terminal 1416 can be in communication with antennas 1412 and 1414, where antennas 1412 and 1414 transmit information to access terminal 1416 over forward link 1420 and receive information from access terminal 1416 over reverse link 1418. Additionally and/or alternatively, access terminal 1422 can be in communication with antennas 1406 and 1408, where antennas 1406 and 1408 transmit information to access terminal 1422 over forward link 1426 and receive information from access terminal 1422 over reverse link 1424. In a frequency division duplex system, communication links 1418, 1420, 1424 and 1426 can use different frequency for communication. For example, forward link 1420 may use a different frequency then that used by reverse link 1418.

Each group of antennas and/or the area in which they are designed to communicate can be referred to as a sector of the access point. In accordance with one aspect, antenna groups can be designed to communicate to access terminals in a sector of areas covered by access point 1400. In communication over forward links 1420 and 1426, the transmitting antennas of access point 1400 can utilize beamforming in order to improve the signal-to-noise ratio of forward links for the different access terminals 1416 and 1422. Also, an access point using beamforming to transmit to access terminals scattered randomly through its coverage causes less interference to access terminals in neighboring cells than an access point transmitting through a single antenna to all its access terminals.

An access point, e.g., access point 1400, can be a fixed station used for communicating with terminals and can also be referred to as a base station, an eNB, an access network, and/or other suitable terminology. In addition, an access terminal, e.g., an access terminal 1416 or 1422, can also be referred to as a mobile terminal, user equipment, a wireless communication device, a terminal, a wireless terminal, and/or other appropriate terminology.

Figure 15:
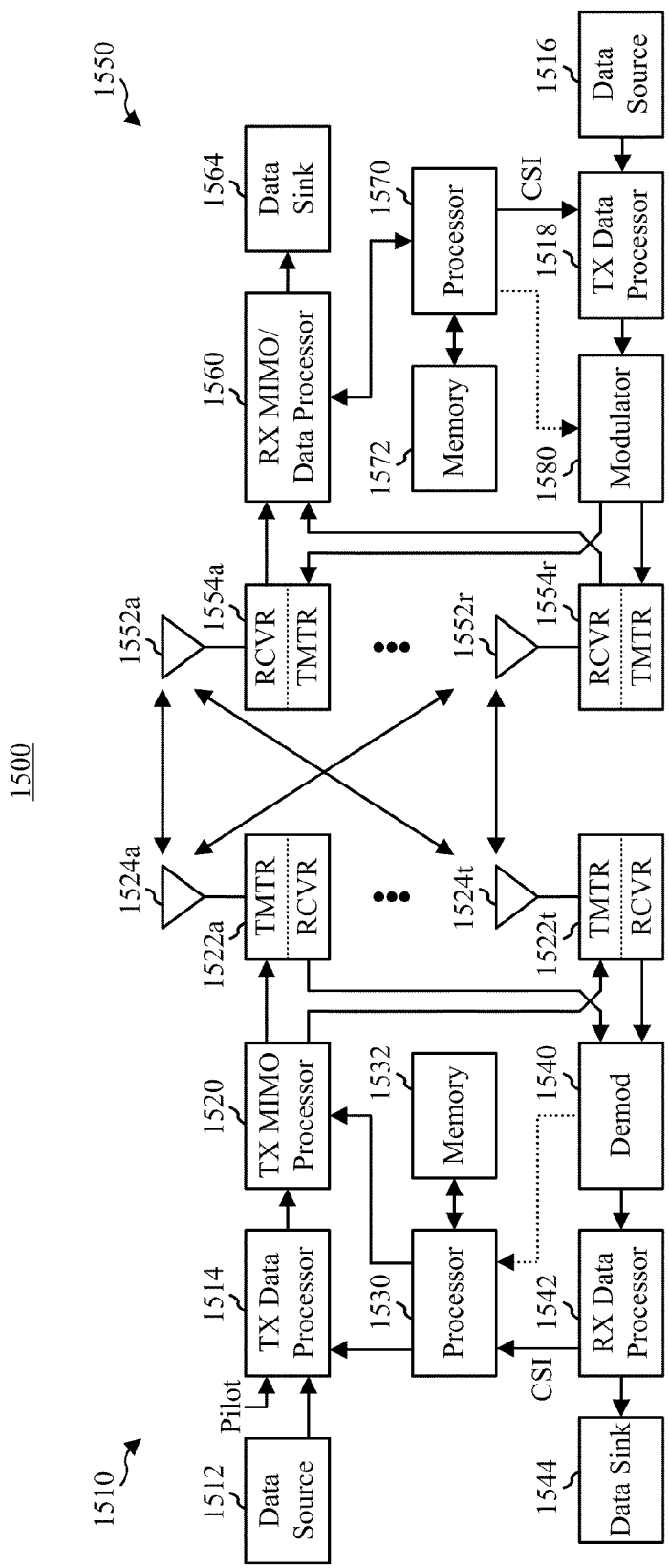
FIG. 15 is a block diagram illustrating an example wireless communication system in which various aspects described herein can function.

Referring now to FIG. 15, a block diagram illustrating an example wireless communication system 1500 in which various aspects described herein can function is provided. In one example, system 1500 is a multiple-input multiple-output (MIMO) system that includes a transmitter system 1510 and a receiver system 1550. It should be appreciated, however, that transmitter system 1510 and/or receiver system 1550 could also be applied to a multi-input single-output system wherein, for example, multiple transmit antennas (e.g., on a base station), can transmit one or more symbol streams to a single antenna device (e.g., a mobile station). Additionally, it should be appreciated that aspects of transmitter system 1510 and/or receiver system 1550 described herein could be utilized in connection with a single output to single input antenna system.

In accordance with one aspect, traffic data for a number of data streams are provided at transmitter system 1510 from a data source 1512 to a transmit (TX) data processor 1514. In one example, each data stream can then be transmitted via a respective transmit antenna 1524. Additionally, TX data processor 1514 can format, encode, and interleave traffic data for each data stream based on a particular coding scheme selected for each respective data stream in order to provide coded data. In one example, the coded data for each data stream can then be multiplexed with pilot data using OFDM techniques. The pilot data can be, for example, a known data pattern that is processed in a known manner. Further, the pilot data can be used at receiver system 1550 to estimate channel response. Back at transmitter system 1510, the multiplexed pilot and coded data for each data stream can be modulated (e.g., symbol mapped) based on a particular modulation scheme (e.g., BPSK, QSPK, M-PSK, or M-QAM) selected for each respective data stream in order to provide modulation symbols. In one example, data rate, coding, and modulation for each data stream can be determined by instructions performed on and/or provided by processor 1530.

Next, modulation symbols for all data streams can be provided to a TX MIMO processor 1520, which can further process the modulation symbols (e.g., for OFDM). TX MIMO processor 1520 can then provides $N_T$ modulation symbol streams to $N_T$ transceivers 1522a through 1522t. In one example, each transceiver 1522 can receive and process a respective symbol stream to provide one or more analog signals. Each transceiver 1522 can then further condition (e.g., amplify, filter, and upconvert) the analog signals to provide a modulated signal suitable for transmission over a MIMO channel. Accordingly, $N_T$ modulated signals from transceivers 1522a through 1522t can then be transmitted from $N_T$ antennas 1524a through 1524t, respectively.

In accordance with another aspect, the transmitted modulated signals can be received at receiver system 1550 by $N_R$ antennas 1552a through 1552r. The received signal from each antenna 1552 can then be provided to respective transceivers 1554. In one example, each transceiver 1554 can condition (e.g., filter, amplify, and downconvert) a respective received signal, digitize the conditioned signal to provide samples, and then processes the samples to provide a corresponding "received" symbol stream. An RX MIMO/data processor 1560 can then receive and process the $N_R$ received symbol streams from $N_R$ transceivers 1554 based on a particular receiver processing technique to provide $N_T$ "detected" symbol streams. In one example, each detected symbol stream can include symbols that are estimates of the modulation symbols transmitted for the corresponding data stream. RX processor 1560 can then process each symbol stream at least in part by demodulating, deinterleaving, and decoding each detected symbol stream to recover traffic data for a corresponding data stream. Thus, the processing by RX processor 1560 can be complementary to that performed by TX MIMO processor 1520 and TX data processor 1514 at transmitter system 1510. RX processor 1560 can additionally provide processed symbol streams to a data sink 1564.

In accordance with one aspect, the channel response estimate generated by RX processor 1560 can be used to perform space/time processing at the receiver, adjust power levels, change modulation rates or schemes, and/or other appropriate actions. Additionally, RX processor 1560 can further estimate channel characteristics such as, for example, signal-to-noise-and-interference ratios (SNRs) of the detected symbol streams. RX processor 1560 can then provide estimated channel characteristics to a processor 1570. In one example, RX processor 1560 and/or processor 1570 can further derive an estimate of the "operating" SNR for the system. Processor 1570 can then provide channel state information (CSI), which can comprise information regarding the communication link and/or the received data stream. This information can include, for example, the operating SNR. The CSI can then be processed by a TX data processor 1518, modulated by a modulator 1580, conditioned by transceivers 1554a through 1554r, and transmitted back to transmitter system 1510. In addition, a data source 1516 at receiver system 1550 can provide additional data to be processed by TX data processor 1518.

Back at transmitter system 1510, the modulated signals from receiver system 1550 can then be received by antennas 1524, conditioned by transceivers 1522, demodulated by a demodulator 1540, and processed by a RX data processor 1542 to recover the CSI reported by receiver system 1550. In one example, the reported CSI can then be provided to processor 1530 and used to determine data rates as well as coding and modulation schemes to be used for one or more data streams. The determined coding and modulation schemes can then be provided to transceivers 1522 for quantization and/or use in later transmissions to receiver system 1550. Additionally and/or alternatively, the reported CSI can be used by processor 1530 to generate various controls for TX data processor 1514 and TX MIMO processor 1520. In another example, CSI and/or other information processed by RX data processor 1542 can be provided to a data sink 1544.

In one example, processor 1530 at transmitter system 1510 and processor 1570 at receiver system 1550 direct operation at their respective systems. Additionally, memory 1532 at transmitter system 1510 and memory 1572 at receiver system 1550 can provide storage for program codes and data used by processors 1530 and 1570, respectively. Further, at receiver system 1550, various processing techniques can be used to process the $N_R$ received signals to detect the $N_T$ transmitted symbol streams. These receiver processing techniques can include spatial and space-time receiver processing techniques, which can also be referred to as equalization techniques, and/or "successive nulling/equalization and interference cancellation" receiver processing techniques, which can also be referred to as "successive interference cancellation" or "successive cancellation" receiver processing techniques.

It is to be understood that the aspects described herein can be implemented by hardware, software, firmware, middleware, microcode, or any combination thereof. When the systems and/or methods are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

What has been described above includes examples of one or more aspects. It is, of course, not possible to describe every conceivable combination of components or methodologies for purposes of describing the aforementioned aspects, but one of ordinary skill in the art can recognize that many further combinations and permutations of various aspects are possible. Accordingly, the described aspects are intended to embrace all such alterations, modifications and variations that fall within the spirit and scope of the appended claims Furthermore, to the extent that the term "includes" is used in either the detailed description or the claims, such term is intended to be inclusive in a manner similar to the term "comprising" as "comprising" is interpreted when employed as a transitional word in a claim. Furthermore, the term "or" as used in either the detailed description or the claims is meant to be a "non-exclusive or."

What is claimed is:

1. A method, comprising:
   identifying one or more priority parameters associated with a communication link and a designated set of resources for communication via the communication link;
   constructing a resource utilization message (RUM), the RUM comprising a request for reduction of transmit power on the designated set of resources and a function of the one or more priority parameters; and
   communicating the RUM to at least one interfering network node, wherein the one or more priority parameters comprise a queue length corresponding to a packet flow associated with the communication link.

2. The method of claim 1, wherein the one or more priority parameters comprise a head-of-line delay corresponding to a packet flow associated with the communication link.

3. The method of claim 1, wherein the one or more priority parameters comprise a burst size of a packet flow associated with the communication link.

4. The method of claim 1, wherein the one or more priority parameters comprise a delay target for a packet flow associated with the communication link.

5. The method of claim 1, wherein the one or more priority parameters comprise an average rate at which the communication link has been served.

6. The method of claim 1, further comprising receiving a RUM request, wherein the constructing and the communicating are performed in response to the receiving.

7. The method of claim 1, further comprising receiving pilot signaling from the at least one interfering network node in response to the RUM.

8. The method of claim 7, further comprising:
   estimating channel quality associated with the designated set of resources based at least in part on the pilot signaling; and
   reporting estimated channel quality associated with the designated set of resources to a serving network node.

9. The method of claim 1, wherein:
   the communication link is a communication link with a serving network node; and
   the constructing comprises embedding one or more parameters into the RUM that indicate a maximum transmit power of the serving network node multiplied by a channel gain from the serving network node in relation to a nominal interference value.

10. The method of claim 9, further comprising determining the nominal interference value at least in part by predicting a total amount of interference caused by the at least one interfering network node in the event that the RUM is accepted by substantially all interfering network nodes.

11. The method of claim 1, wherein:
    the communication link is a communication link with a serving network node; and
    the communicating comprises communicating the RUM at a transmit power determined as a function of a maximum transmit power of the serving network node and a channel gain from the serving network node.

12. A wireless communications apparatus, comprising:
    a memory that stores data relating to a communication link, one or more priority parameters associated with the communication link, and a designated set of resources for communication via the communication link; and
    a processor configured to construct a resource utilization message (RUM), the RUM comprising a request for reduction of transmit power on the designated set of resources and a function of the one or more priority parameters, and to communicate the RUM to at least one interfering network node, wherein the one or more priority parameters comprise a burst size of a packet flow associated with the communication link.

13. The wireless communications apparatus of claim 12, wherein the one or more priority parameters comprise a head-of-line delay corresponding to a packet flow associated with the communication link.

14. The wireless communications apparatus of claim 12, wherein the one or more priority parameters comprise a queue length corresponding to a packet flow associated with the communication link.

15. The wireless communications apparatus of claim 12, wherein the one or more priority parameters comprise at least one of a delay target for a packet flow associated with the communication link, or an average rate at which the communication link has been served.

16. The wireless communications apparatus of claim 12, wherein the processor is further configured to receive a RUM request from a serving network node and to construct and communicate the RUM in response to the RUM request.

17. The wireless communications apparatus of claim 12, wherein the processor is further configured to receive pilot signaling from the at least one interfering network node in response to the RUM, to estimate channel quality associated with the designated set of resources based at least in part on the pilot signaling, and to report estimated channel quality associated with the designated set of resources to a serving network node.

18. An apparatus, comprising:
    means for constructing resource utilization messaging that includes a request for power backoff on a specified set of resources and a function of at least one priority metric associated with the specified set of resources; and
    means for communicating the resource utilization messaging to at least one network node from which interference is observed, wherein the at least one priority metric comprises a delay target for packet flow associated with a communication link on the specified set of resources.

19. The apparatus of claim 18, wherein the at least one priority metric comprises one or more of a head-of-line delay corresponding to a packet flow associated with a communication link on the specified set of resources, a queue length corresponding to a packet flow associated with a communication link on the specified set of resources, a burst size of a packet flow associated with a communication link on the specified set of resources, or an average rate at which a communication link has been served on the specified set of resources.

20. The apparatus of claim 18, further comprising means for receiving a request for resource utilization messaging from a serving network node, wherein the means for constructing and the means for communicating are utilized in response to the request for resource utilization messaging.

21. The apparatus of claim 18, further comprising means for receiving pilot signaling from the at least one network node from which interference is observed in response to the resource utilization messaging.

22. The apparatus of claim 21, further comprising:
    means for estimating channel quality on the specified set of resources based at least in part on the pilot signaling; and
    means for reporting estimated quality associated with the specified set of resources to a serving network node.

23. A computer program product, comprising:
    a non-transitory computer-readable medium, comprising:
        code for causing a computer to construct resource utilization messaging that includes a request for power backoff on a specified set of resources and a function of at least one priority metric associated with the specified set of resources; and
        code for causing a computer to communicate the resource utilization messaging to at least one network node from which interference is observed, wherein the at least one priority metric comprises a head-of-line delay corresponding to a packet flow associated with a communication link on the specified set of resources.

24. The computer program product of claim 23, wherein the at least one priority metric comprises one or more of a queue length corresponding to a packet flow associated with a communication link on the specified set of resources, a burst size of a packet flow associated with a communication link on the specified set of resources, a delay target for packet flow associated with a communication link on the specified set of resources, or an average rate at which a communication link has been served on the specified set of resources.

25. The computer program product of claim 23, wherein:
    the computer-readable medium further comprises code for causing a computer to receive a request for resource utilization messaging from a serving network node; and
    the code for causing a computer to construct and the code for causing a computer to communicate are executed in response to the request for resource utilization messaging.

26. The computer program product of claim 23, wherein the computer-readable medium further comprises:
    code for causing a computer to receive pilot signaling from the at least one network node from which interference is observed in response to the resource utilization messaging;
    code for causing a computer to estimate quality of the specified set of resources based at least in part on the pilot signaling; and
    code for causing a computer to report estimated quality of the specified set of resources to a serving network node.

27. A method, comprising:
    obtaining respective resource utilization messages (RUMs) requesting power backoff on a specified set of resources, the respective RUMs comprising one or more parameters constructed as a function of at least one priority metric;
    determining an extent of power backoff to be performed on the specified set of resources based on the respective RUMs and the one or more parameters constructed as a function of at least one priority metric within the respective RUMs and based on computing quality of service (QoS) changes associated with a plurality of power backoff levels on the specified set of resources; and
    backing off power on the specified set of resources according to a power backoff level determined to have a highest QoS change from among the plurality of power backoff levels.

28. The method of claim 27, wherein the at least one priority metric comprises head-of-line delays corresponding to respective packet flows associated with respective communication links.

29. The method of claim 27, wherein the at least one priority metric comprises queue lengths corresponding to respective packet flows associated with respective communication links.

30. The method of claim 27, wherein the at least one priority metric comprises burst sizes of respective packet flows associated with respective communication links.

31. The method of claim 27, wherein the at least one priority metric comprises delay targets for respective packet flows associated with respective communication links.

32. The method of claim 27, wherein the at least one priority metric comprises respective average rates at which respective communication links have been served.

33. The method of claim 27, further comprising signaling the extent of power backoff to be performed on the specified set of resources in a pilot transmission.

34. The method of claim 27, wherein:
    the obtaining comprises obtaining the respective RUMs from one or more terminals; and
    the respective RUMs further comprise at least one of parameters relating to maximum transmit powers of respective serving network nodes for the one or more terminals, parameters relating to channel gain associated with respective communication links between the one or more terminals and respective serving network nodes for the one or more terminals, or nominal interference parameters.

35. The method of claim 34, further comprising identifying at least one of a parameter relating to a maximum transmit power of a serving network node for a terminal or a parameter relating to channel gain associated with a communication link between a terminal and a serving network node for the terminal from a RUM based on a received power of the RUM.

36. A wireless communications apparatus, comprising:
a memory that stores data relating to respective resource utilization messages (RUMs) requesting power backoff on a specified set of resources, the respective RUMs comprising one or more parameters constructed as a function of at least one priority metric; and
a processor configured to:
determine an extent of power backoff to be performed on the specified set of resources based on the respective RUMs and the one or more parameters constructed as a function of at least one priority metric within the respective RUMs;
compute quality of service (QoS) changes associated with a plurality of power backoff levels on the specified set of resources; and
back off transmit power on the specified set of resources according to a power backoff level determined to have a highest QoS change from among the plurality of power backoff levels.

37. The wireless communications apparatus of claim 36, wherein the at least one priority metric comprises one or more of head-of-line delays corresponding to respective packet flows associated with respective communication links or queue lengths corresponding to respective packet flows associated with respective communication links.

38. The wireless communications apparatus of claim 36, wherein the at least one priority metric comprises one or more of burst sizes of respective packet flows associated with respective communication links, delay targets for respective packet flows associated with respective communication links, or respective average rates at which respective communication links have been served.

39. The wireless communications apparatus of claim 36, wherein the processor is further configured to signal the extent of power backoff to be performed on the specified set of resources in a pilot transmission.

40. An apparatus, comprising:
means for receiving resource utilization messaging that includes a request for transmit power reduction on designated resources and a function of one or more link quality metrics associated with the designated resources;
means for determining an amount of transmit power reduction to be applied on the designated resources based at least in part on the one or more parameters constructed as a function of at least one priority metric provided in the resource utilization messaging, wherein the means for determining comprises means for computing quality of service (QoS) changes associated with a plurality of power backoff levels on the designated resources; and
means for backing off power on the designated resources according to a power backoff level determined to have a highest QoS change from among the plurality of power backoff levels.

41. The apparatus of claim 40, wherein the one or more link quality metrics comprise at least one of head-of-line delays corresponding to respective packet flows associated with respective communication links on the designated resources, queue lengths corresponding to respective packet flows associated with respective communication links on the designated resources, burst sizes of respective packet flows associated with respective communication links on the designated resources, delay targets for respective packet flows associated with respective communication links on the designated resources, or respective average rates at which respective communication links have been served on the designated resources.

42. A computer program product, comprising:
a non-transitory computer-readable medium, comprising:
code for causing a computer to receive resource utilization messaging that includes a request for transmit power reduction on designated resources and a function of one or more link quality metrics associated with the designated resources;
code for causing a computer to determine an amount of transmit power reduction to be applied on the designated resources based at least in part on the one or more parameters constructed as a function of at least one priority metric provided in the resource utilization messaging, wherein the code for causing a computer to determine comprises code for causing a computer to compute quality of service (QoS) changes associated with a plurality of power backoff levels on the designated resources; and
code for causing a computer to back off transmit power on the designated resources according to a power backoff level determined to have a highest QoS change from among the plurality of power backoff levels.

43. The computer program product of claim 42, wherein the one or more link quality metrics comprise at least one of head-of-line delays corresponding to respective packet flows associated with respective communication links on the designated resources, queue lengths corresponding to respective packet flows associated with respective communication links on the designated resources, burst sizes of respective packet flows associated with respective communication links on the designated resources, delay targets for respective packet flows associated with respective communication links on the designated resources, or respective average rates at which respective communication links have been served on the designated resources.

44. A wireless communications apparatus, comprising:
a memory that stores data relating to a communication link, one or more priority parameters associated with the communication link, and a designated set of resources for communication via the communication link; and
a processor configured to construct a resource utilization message (RUM), the RUM comprising a request for reduction of transmit power on the designated set of resources and a function of the one or more priority parameters, and to communicate the RUM to at least one interfering network node, wherein the one or more priority parameters comprise a queue length corresponding to a packet flow associated with the communication link.

45. An apparatus, comprising:
means for constructing resource utilization messaging that includes a request for power backoff on a specified set of resources and a function of at least one priority metric associated with the specified set of resources; and
means for communicating the resource utilization messaging to at least one network node from which interference is observed, wherein the at least one priority metric comprises a queue length corresponding to a packet flow associated with the communication link.

46. A computer program product, comprising:
a non-transitory computer-readable medium, comprising:
code for causing a computer to construct resource utilization messaging that includes a request for power backoff on a specified set of resources and a function of at least one priority metric associated with the specified set of resources; and
code for causing a computer to communicate the resource utilization messaging to at least one network node from which interference is observed, wherein the at least one priority metric comprises a head-of-line delay corresponding to a queue length corresponding to a packet flow associated with the communication link.

47. A method, comprising:
identifying one or more priority parameters associated with a communication link and a designated set of resources for communication via the communication link;
constructing a resource utilization message (RUM), the RUM comprising a request for reduction of transmit power on the designated set of resources and a function of the one or more priority parameters; and
communicating the RUM to at least one interfering network node, wherein the one or more priority parameters comprise a burst size of a packet flow associated with the communication link.

48. An apparatus, comprising:
means for constructing resource utilization messaging that includes a request for power backoff on a specified set of resources and a function of at least one priority metric associated with the specified set of resources; and
means for communicating the resource utilization messaging to at least one network node from which interference is observed, wherein the at least one priority metric comprises a burst size of a packet flow associated with the communication link.

49. A computer program product, comprising:
a non-transitory computer-readable medium, comprising:
code for causing a computer to construct resource utilization messaging that includes a request for power backoff on a specified set of resources and a function of at least one priority metric associated with the specified set of resources; and
code for causing a computer to communicate the resource utilization messaging to at least one network node from which interference is observed, wherein the at least one priority metric comprises a head-of-line delay corresponding to a burst size of a packet flow associated with the communication link.

50. A method, comprising:
identifying one or more priority parameters associated with a communication link and a designated set of resources for communication via the communication link;
constructing a resource utilization message (RUM), the RUM comprising a request for reduction of transmit power on the designated set of resources and a function of the one or more priority parameters; and
communicating the RUM to at least one interfering network node, wherein the one or more priority parameters comprise a delay target for packet flow associated with a communication link on the specified set of resources.

51. A wireless communications apparatus, comprising:
a memory that stores data relating to a communication link, one or more priority parameters associated with the communication link, and a designated set of resources for communication via the communication link; and
a processor configured to construct a resource utilization message (RUM), the RUM comprising a request for reduction of transmit power on the designated set of resources and a function of the one or more priority parameters, and to communicate the RUM to at least one interfering network node, wherein the one or more priority parameters comprise a delay target for packet flow associated with a communication link on the specified set of resources.

52. A computer program product, comprising:
a non-transitory computer-readable medium, comprising:
code for causing a computer to construct resource utilization messaging that includes a request for power backoff on a specified set of resources and a function of at least one priority metric associated with the specified set of resources; and
code for causing a computer to communicate the resource utilization messaging to at least one network node from which interference is observed, wherein the at least one priority metric comprises a head-of-line delay corresponding to a delay target for packet flow associated with a communication link on the specified set of resources.

53. A method, comprising:
identifying one or more priority parameters associated with a communication link and a designated set of resources for communication via the communication link;
constructing a resource utilization message (RUM), the RUM comprising a request for reduction of transmit power on the designated set of resources and a function of the one or more priority parameters; and
communicating the RUM to at least one interfering network node, wherein the one or more priority parameters comprise a packet flow associated with a communication link on the specified set of resources.

54. A wireless communications apparatus, comprising:
a memory that stores data relating to a communication link, one or more priority parameters associated with the communication link, and a designated set of resources for communication via the communication link; and
a processor configured to construct a resource utilization message (RUM), the RUM comprising a request for reduction of transmit power on the designated set of resources and a function of the one or more priority parameters, and to communicate the RUM to at least one interfering network node, wherein the one or more priority parameters comprise a packet flow associated with a communication link on the specified set of resources.

55. An apparatus, comprising:
means for constructing resource utilization messaging that includes a request for power backoff on a specified set of resources and a function of at least one priority metric associated with the specified set of resources; and
means for communicating the resource utilization messaging to at least one network node from which interference is observed, wherein the at least one priority metric comprises a packet flow associated with a communication link on the specified set of resources.

* * * * *